US010601929B2

(12) United States Patent
Sundaresan

(10) Patent No.: US 10,601,929 B2
(45) Date of Patent: *Mar. 24, 2020

(54) SYSTEMS AND METHODS FOR PRESENTING A STATE OF A COMMUNICATION SESSION

(71) Applicant: eBay Inc., San Jose, CA (US)

(72) Inventor: Neelakantan Sundaresan, Mountain View, CA (US)

(73) Assignee: eBay Inc., San Jose, CA (US)

(*) Notice: Subject to any disclaimer, the term of this patent is extended or adjusted under 35 U.S.C. 154(b) by 9 days.

This patent is subject to a terminal disclaimer.

(21) Appl. No.: 15/881,338

(22) Filed: Jan. 26, 2018

(65) Prior Publication Data
US 2018/0152520 A1    May 31, 2018

Related U.S. Application Data

(63) Continuation of application No. 15/405,108, filed on Jan. 12, 2017, now Pat. No. 9,912,756, which is a
(Continued)

(51) Int. Cl.
G06F 15/16 (2006.01)
H04L 29/08 (2006.01)
(Continued)

(52) U.S. Cl.
CPC ........ H04L 67/142 (2013.01); G06F 16/9574 (2019.01); H04L 67/02 (2013.01);
(Continued)

(58) Field of Classification Search
USPC .............. 709/200, 203, 226, 228, 245, 227
See application file for complete search history.

(56) References Cited

U.S. PATENT DOCUMENTS 5,963,964 A * 10/1999 Nielsen ............. G06F 17/30884
707/E17.013
7,266,510 B1   9/2007 Cofino et al.
(Continued)

FOREIGN PATENT DOCUMENTS

AU   2015219171 B2   4/2017
AU   2014364512 B2   6/2017
(Continued)

OTHER PUBLICATIONS

Response to First Examination Report filed on Apr. 7, 2017 for Australian Patent Application No. 2014364512, dated Nov. 30, 2016, 22 pages.
(Continued)

Primary Examiner — Liang Che A Wang
(74) Attorney, Agent, or Firm — Schwegman Lundberg & Woessner, P.A.

(57) ABSTRACT

A system comprising a computer-readable storage medium storing at least one program and a computer-implemented method for automatically saving and presenting a state of a communication session are presented. The communication session may be established between a client device of a user and an application server of a content publisher. Session data representative of a first state of the communication session may be stored in response to user input. The method may further include generating and presenting an interface that includes a first selectable element that allows a user to return to the first state of the communication session. The method further includes grouping the first selectable element with a second selectable element corresponding a second state of the communication session and assigning a label to the grouping.

18 Claims, 14 Drawing Sheets

Related U.S. Application Data continuation of application No. 14/183,106, filed on Feb. 18, 2014, now Pat. No. 9,549,028.

(51) Int. Cl.
*H04W 4/21* (2018.01)
*G06F 16/957* (2019.01)
*H04W 4/60* (2018.01)
H04L 29/06 (2006.01)

(52) U.S. Cl.
CPC .............. *H04W 4/21* (2018.02); *H04W 4/60* (2018.02); *H04L 67/42* (2013.01)

(56) References Cited

U.S. PATENT DOCUMENTS

| | | | |
|---|---|---|---|
| 7,614,004 | B2 | 11/2009 | Milic et al. |
| 8,166,406 | B1 | 4/2012 | Goldfeder et al. |
| 8,600,784 | B1* | 12/2013 | Ivey ................. G06Q 50/14 |
| | | | 705/5 |
| 8,631,029 | B1 | 1/2014 | Amacker |
| 8,739,044 | B1* | 5/2014 | Varadarajan .......... G06F 3/0481 |
| | | | 709/204 |
| 8,856,039 | B1 | 10/2014 | Talreja et al. |
| 9,549,028 | B2 | 1/2017 | Sundaresan |
| 9,740,777 | B2 | 8/2017 | Carrillo et al. |
| 9,912,756 | B2 | 3/2018 | Sundaresan |
| 2003/0080986 | A1 | 5/2003 | Baird |
| 2003/0195963 | A1* | 10/2003 | Song ................. G06F 17/30861 |
| | | | 709/227 |
| 2005/0066037 | A1 | 3/2005 | Song et al. |
| 2005/0132296 | A1* | 6/2005 | Milic-Frayling ........................ |
| | | | G06F 17/30873 |
| | | | 715/745 |
| 2006/0248200 | A1 | 11/2006 | Stanev |
| 2007/0022385 | A1 | 1/2007 | Denissov |
| 2008/0040484 | A1 | 2/2008 | Yardley |
| 2008/0288362 | A1 | 11/2008 | King |
| 2009/0024946 | A1 | 1/2009 | Gotz |
| 2009/0089267 | A1 | 4/2009 | Chi et al. |
| 2009/0132516 | A1 | 5/2009 | Patel et al. |
| 2009/0265255 | A1 | 10/2009 | Jackson et al. |
| 2010/0005097 | A1 | 1/2010 | Liang et al. |
| 2010/0048167 | A1 | 2/2010 | Chow et al. |
| 2010/0050068 | A1 | 2/2010 | Usami |
| 2010/0082637 | A1* | 4/2010 | Mishne ............. G06F 17/30867 |
| | | | 707/748 |
| 2010/0325357 | A1* | 12/2010 | Reddy ................ G06F 21/53 |
| | | | 711/118 |
| 2011/0213678 | A1* | 9/2011 | Chorney ............... G06Q 30/06 |
| | | | 705/26.61 |
| 2012/0066602 | A1 | 3/2012 | Chai et al. |
| 2012/0092277 | A1 | 4/2012 | Momchilov |
| 2012/0216102 | A1 | 8/2012 | Malla |
| 2012/0216124 | A1* | 8/2012 | Martino ............ G06F 17/30884 |
| | | | 715/739 |
| 2013/0101101 | A1* | 4/2013 | Waghmare ............ H04M 15/70 |
| | | | 379/114.01 |
| 2013/0231146 | A1 | 9/2013 | Mathias et al. |
| 2013/0232113 | A1 | 9/2013 | Liang et al. |
| 2014/0129455 | A1* | 5/2014 | Davidson ............... G06Q 50/18 |
| | | | 705/311 |
| 2014/0289598 | A1 | 9/2014 | Charitos |
| 2014/0359735 | A1 | 12/2014 | Lehmann et al. |
| 2015/0177934 | A1 | 6/2015 | Carrillo et al. |
| 2015/0193851 | A1 | 7/2015 | Hua et al. |
| 2015/0237147 | A1 | 8/2015 | Sundaresan |
| 2017/0126813 | A1 | 5/2017 | Sundaresan |
| 2017/0316093 | A1 | 11/2017 | Carrillo et al. |

FOREIGN PATENT DOCUMENTS

| | | |
|---|---|---|
| CA | 2940052 C | 3/2019 |
| CN | 102270331 A | 12/2011 |
| CN | 102521317 A | 6/2012 |
| CN | 105874450 A | 8/2016 |
| CN | 106164822 A | 11/2016 |
| JP | 2005-242760 A | 9/2005 |
| JP | 2006-243861 A | 9/2006 |
| JP | 2011-034295 A | 2/2011 |
| JP | 2011-159113 A | 8/2011 |
| JP | 2011-159281 A | 8/2011 |
| JP | 2012-146028 A | 8/2012 |
| JP | 2013-120603 A | 6/2013 |
| KR | 10-1913920 | 10/2018 |
| WO | 2002/025466 A2 | 3/2002 |
| WO | 2007/116705 A1 | 10/2007 |
| WO | 2013/105128 A1 | 7/2013 |
| WO | 2015/095519 A1 | 6/2015 |
| WO | 2015/126835 A1 | 8/2015 |

OTHER PUBLICATIONS

Final Office Action received for U.S. Appl. No. 14/137,085, dated Aug. 11, 2016, 21 pages.
Non-Final Office Action received for U.S. Appl. No. 14/137,085, dated Jan. 21, 2016, 19 pages.
Notice of Allowance received for U.S. Appl. No. 14/137,085, dated Jan. 13, 2017, 19 pages.
Response to Final Office Action filed on Nov. 2, 2016 for U.S. Appl. No. 14/137,085, dated Aug. 11, 2016, 15 pages.
Response to Non-Final Office Action filed on Apr. 21, 2016 for U.S. Appl. No. 14/137,085, dated Jan. 21, 2016, 14 pages.
Corrected Notice of Allowability received for U.S. Appl. No. 14/183,106, dated Dec. 14, 2016, 6 pages.
International Written Opinion received for PCT Application No. PCT/US2015/016181, dated May 21, 2015, 7 pages.
Corrected Notice of Allowability received for U.S. Appl. No. 14/183,106, dated Oct. 6, 2016, 7 pages.
Corrected Notice of Allowability received for U.S. Appl. No. 14/183,106, dated Sep. 16, 2016, 7 pages.
Non-Final Office Action received for U.S. Appl. No. 14/183,106, dated Apr. 15, 2016, 17 pages.
Notice of Allowance received for U.S. Appl. No. 14/183,106, dated Aug. 13, 2016, 9 pages.
Response to Non-Final Office Action filed on Jul. 15, 2016 for U.S. Appl. No. 14/183,106, dated Apr. 15, 2016, 17 pages.
Extended European Search Report received for European Patent Application No. 14871877.8, dated Jan. 23, 2017, 14 pages.
Extended European Search Report received for European Patent Application No. 15752010.7, dated Nov. 15, 2017, 9 pages.
Response to Office Action filed on Oct. 3, 2017 for Canadian Patent Application No. 2,933,580, dated Apr. 10, 2017, 17 pages.
Response to Office Action filed on Sep. 5, 2017 for Canadian Patent Application No. 2,940,052, dated Mar. 27, 2017, 24 pages.
First Examination Report received for Australian Patent Application No. 2015219171, dated Jan. 25, 2017, 3 pages.
Response to First Examination Report filed on Apr. 6, 2017 for Australian Patent Application No. 2015219171, dated Jan. 25, 2017, 21 pages.
Office Action received for Japanese Patent Application No. 2016-552640, dated Aug. 1, 2017, 4 pages.
Response to Office Action filed on Oct. 27, 2017 for Japanese Patent Application No. 2016-552640, dated Aug. 1, 2017, 15 pages.
International Preliminary Report on Patentability received for PCT Application No. PCT/US2014/071155, dated Jun. 30, 2016, 8 pages.
International Search Report received for PCT Application No. PCT/US2014/071155, dated Mar. 31, 2015, 2 pages.
International Written Opinion received for PCT Application No. PCT/US2014/071155, dated Mar. 31, 2015, 6 pages.
International Preliminary Report on Patentability received for PCT Application No. PCT/US2015/016181, dated Sep. 1, 2016, 9 pages.
International Search Report received for PCT Application No. PCT/US2015/016181, dated May 21, 2015, 2 pages.
Office Action received for Korean Patent Application No. 10-2016-7019698, dated Aug. 9, 2017, 11 pages.

(56) References Cited

OTHER PUBLICATIONS

Response to Office Action filed on Oct. 10, 2017 for Korean Patent Application No. 10-2016-7019698, dated Aug. 9, 2017, 30 pages.
Norix, "Save Session", Firefox Add-ons, Retrieved from the Internet URL: <https://addons.mozilla.org/en-US/firefox/addon/save-session/>, Jul. 21, 2009, 2 pages.
Sundaram, "How-To: Save and Restore Your Browsing History in Firefox", Retrieved from the Internet URL: <http://techawakening.org/how-to-save-history-in-firefox/915/>, Accessed on May 9, 2018, 5 pages.
Office Action received for Korean Patent Application No. 10-2016-7025298, dated Feb. 9, 2018, 11 pages (5 pages of English Translation and 6 pages of Official Copy).
Response to Office Action filed on Apr. 9, 2018 for Korean Patent Application No. 10-2016-7025298, dated Feb. 9, 2018, 34 pages (26 pages of Official Copy and 8 pages of English Claims).
Corrected Notice of Allowability received for U.S. Appl. No. 14/137,085, dated Jul. 20, 2017, 2 pages.
Corrected Notice of Allowability received for U.S. Appl. No. 15/405,108, dated Dec. 29, 2017, 2 pages.
First Action Interview—Pre-Interview Communication received for U.S. Appl. No. 15/405,108, dated May 25, 2017, 4 pages.
First Action Interview—Office Action Summary received for U.S. Appl. No. 15/405,108, dated Jul. 18, 2017, 4 pages.
Notice of Allowance received for U.S. Appl. No. 15/405,108, dated Oct. 25, 2017, 12 Pages.
Preliminary Amendment received for U.S. Appl. No. 15/405,108, filed Feb. 10, 2017, 7 pages.
Response to First Action Interview—Office Action Summary filed on Aug. 27, 2017 for U.S. Appl. No. 15/405,108, dated Jul. 18, 2017, 11 pages.
Office Action received for Canadian Patent Application No. 2,933,580, dated Apr. 10, 2017, 8 pages.
Office Action received for Canadian Patent Application No. 2,940,052, dated Feb. 13, 2018, 3 Pages.
Office Action received for Canadian Patent Application No. 2,940,052, dated Mar. 27, 2017, 7 pages.
Response to Office Action filed on Mar. 26, 2018 for Canadian Patent Application No. 2,940,052, dated Feb. 13, 2018, 13 pages.
First Examination Report received for Australian Patent Application No. 2014364512, dated Nov. 30, 2016, 3 pages.
Notice of Allowance received for Japanese Patent Application No. 2016-552640, dated Dec. 19, 2017, 6 pages (3 pages of English Translation and 3 pages of Official Copy).
Office Action received for Korean Patent Application No. 10-2016-7025298, dated Jun. 8, 2018, 5 pages (w/ English Translation).
Response to Office Action filed on Jul. 31, 2018, for Korean Patent Application No. 10-2016-7025298, dated Jun. 8, 2018, 18 pages (w/English Claims).
Office Action received for Korean Patent Application No. 10-2018-7013182, dated Jun. 19, 2018, 5 pages (w/ English Translation).
Office Action received for Chinese Patent Application No. 201580017656.7, dated Jun. 5, 2018, 8 pages. (w/ English Translation).
European Application Serial No. 15752010.7 Response filed May 24, 2018 to Communication pursuant to Rules 70(2) and 70a(2) EPC, 58 pages.
U.S. Appl. No. 15/405,108, Response filed Jun. 26, 2017 to Pre-Interview Communication dated May 25, 2017, 2 pages.
European Application Serial No. 15752010.7, Response filed Jan. 2, 2017 to Communication pursuant to Rules 161(2) and 162 EPC dated Sep. 28, 2016, 9 pages.
European Application Serial No. 14871877.8, Response filed Aug. 11, 2016 to Communication pursuant to Rules 161(2) and 162 EPC dated Jul. 29, 2016, 11 pages.
International Application Serial No. PCT/US2014/071155, International Search Report dated Mar. 24, 2015, 2 pages.
International Application Serial No. PCT/US2014/071155, Written Opinion dated Mar. 24, 2015, 6 pages.
"Chinese Application Serial No. 201580017656.7, Office Action dated Jan. 14, 2019", W English Translation, 16 pgs.
Response to Office Action filed on Oct. 18, 2018 for Chinese Patent Application No. 201580017656.7, dated Jun. 5, 2018, 17 pages (6 pages of English Translation and 11 pages of Official Copy).
Office Action received for Chinese Patent Application No. 201480069762.5, dated Sep. 6, 2018, 9 pages (Official Copy Only).
U.S. Appl. No. 15/405,108, filed Jan. 12, 2017, Issued.
U.S. Appl. No. 14/183,106, filed Feb. 18, 2014, Issued.
Communication Pursuant to Article 94(3) EPC received for European Patent Application No. 15752010.7, dated Feb. 25, 2019, 9 pages.
Office Action received for Chinese Patent Application No. 201480069762.5, dated Feb. 19, 2019, 21 pages (8 pages of Official Copy and 13 pages of English Translation).
Office Action received for Japan Patent Application No. 2018-005338 dated Feb. 5, 2019, 6 pages (3 pages of Official Copy and 3 pages of English Translation).
Response to Office Action filed on Jan. 21, 2019, for Chinese Patent Application No. 201480069762.5, dated Sep. 6, 2018, 12 Pages (3 pages of English Translation and 9 pages of Official Copy.
Response to Office Action filed on May 6, 2019, for Chinese Patent Application No. 201480069762.5, dated Feb. 19, 2019, 13 pages (3 pages of English Translation and 10 pages of Official Copy).
Response to Office Action filed on Mar. 29, 2019, for Chinese Patent Application No. 201580017656.7, dated Jan. 14, 2019, 12 pages (5 pages of English Translation and 7 pages of Official Copy).
Response to Office Action filed on Apr. 26, 2019 for Japanese Patent Application No. 2018-005338, dated Feb. 5, 2019, 7 pages (3 pages of English Translation and 4 pages of Official copy).
Response to First Action Interview—Pre-Interview Communication filed Jul. 9, 2019, for U.S. Appl. No. 15/655,522, dated Jun. 24, 2019, 7 pages.
First Action Interview—Office Action Summary received for U.S. Appl. No. 15/655,522, dated Jul. 18, 2019, 9 pages.
First Action Interview Pre-Interview Communication received for U.S. Appl. No. 15/655,522, dated Jun. 24, 2019, 8 pages.
Communication Pursuant to Article 94(3) EPC received for European Patent Application No. 15752010.7, dated Sep. 27, 2019, 9 pages.
Office Action Received for Chinese Patent Application No. 201580017656.7, dated Aug. 2, 2019, 14 pages (7 pages official copy and 7 pages English machine translation).
Response to Communication Pursuant to Article 94(3) EPC filed on Sep. 5, 2019 for European Patent Application No. 15752010.7, dated Feb. 25, 2019, 11 pages.
Response to First Action Interview—Office Action Summary filed Aug. 16, 2019 for U.S. Appl. No. 15/655,522, dated Jul. 18, 2019, 16 pages.

* cited by examiner

SYSTEMS AND METHODS FOR PRESENTING A STATE OF A COMMUNICATION SESSION

PRIORITY CLAIMS

This application is a continuation of and claims the benefit of priority to U.S. patent application Ser. No. 15/405,108, filed Jan. 12, 2017, which application is a continuation of and claims the benefit of priority to U.S. patent application Ser. No. 14/183,106, filed on Feb. 18, 2014, entitled "SYSTEMS AND METHODS FOR AUTOMATICALLY SAVING A STATE OF A COMMUNICATION SESSION," which applications are hereby incorporated by reference.

TECHNICAL FIELD

This application relates to data processing. In particular, example embodiments may relate to systems and methods for automatically saving a state of a data exchange session.

BACKGROUND

Users browsing through online content may wish to return to a previous state of their browsing experience (e.g., a previously visited webpage) Current bookmarking technology provided by Internet browsers allow users to "bookmark" (e.g., save) certain web pages. However, such bookmarking services are limited in the types of data that may be recalled (e.g., no contextual information is saved) and are often unable to save the state of certain pages (e.g., checkout pages, filled out forms, etc.) with elements that may be time sensitive. Thus, in order to return to the desired state of their browsing session, users must go through the inefficient process of recreating each of the steps (e.g., keyword searches performed, items clicked, pages viewed or the like) that lead to the desired state. Further, users must be conscious of the need to revisit such pages at the time of bookmarking. Moreover, in some instances, a user may need to revisit a certain step in their browsing process multiple times during a particular session, but never again once the session has terminated. In these instances, the user would not likely go through the effort of creating a bookmark, although the need to revisit the page exists.

BRIEF DESCRIPTION OF THE DRAWINGS

Various ones of the appended drawings merely illustrate example embodiments of the present invention and cannot be considered as limiting its scope.

DETAILED DESCRIPTION

Figure 1:
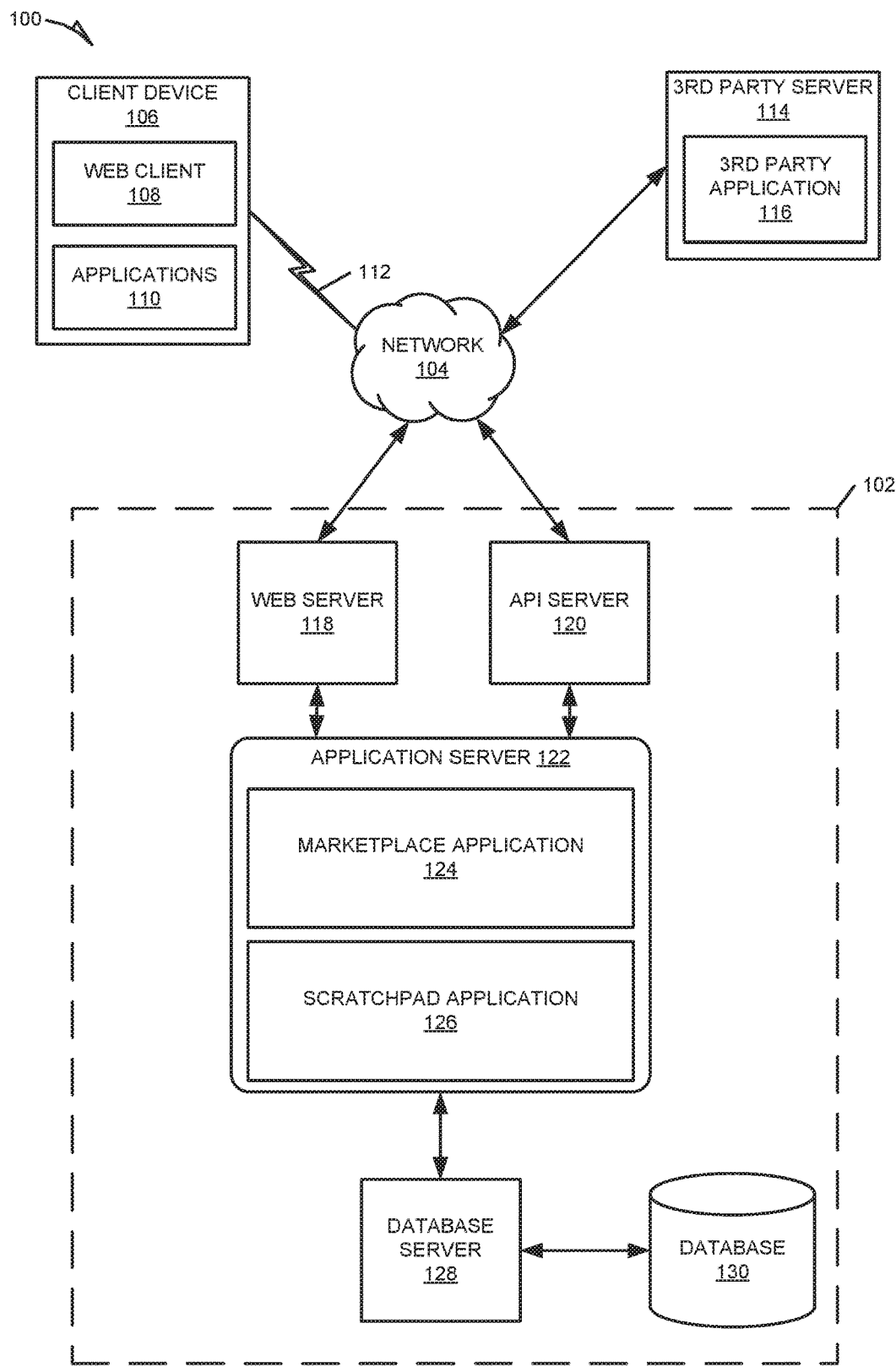
FIG. 1 is a network diagram depicting a network system having a client-server architecture configured for exchanging data over a network, according to an example embodiment.

Reference will now be made in detail to specific example embodiments for carrying out the inventive subject matter. Examples of these specific embodiments are illustrated in the accompanying drawings. It will be understood that they are not intended to limit the scope of the claims to the described embodiments. On the contrary, they are intended to cover alternatives, modifications, and equivalents as may be included within the scope of the disclosure. In the following description, specific details are set forth in order to provide a thorough understanding of the subject matter. Embodiments may be practiced without some or all of these specific details. In accordance with the present disclosure, components, process steps, and data structures may be implemented using various types of operating systems, programming languages, computing platforms, computer programs, and/or general purpose machines.

Aspects of the present disclosure describe systems and methods for saving and presenting a state of a communication session. The communication session may be established between a client device and an application server of a content publisher, and may include the presentation of content on the client device. For example, a communication session may include searching, viewing, comparing, and purchasing items offered for sale in an online marketplace. The state of the communication session may represent the entire context leading to and forming the condition of a communication session at a particular time. The state of the communication session may include a series of actions performed by a user while being engaged in online activity (e g., viewing a webpage, exchanging data with an application server, etc.). As used herein, a "user" or an "entity" may be a person (e.g., a human), a business (e.g., a company), an organization, a group of people, a persona (e.g., a fictitious character), a hot, or any combination thereof Session data representative of the state of the communication session may be automatically stored, consistent with some embodiments. In other embodiments, the method may include receiving user input to save a state of the communication session, and in response to the user input, saving session data representative of the state of the communication session.

The method may further include generating and causing the presentation of an interface that includes a visual representation of the saved state. These interfaces may allow a user to navigate back to the saved state of the communication session. In this manner, a user may be able to recall a state of the communication session without having to recreate the flow (e.g., the series of actions leading to the saved state) of the communication session. Additionally, a user may avoid repeating operations that the user typically performs multiple times during a given communication session.

Aspects of the present disclosure may also include systems and methods for grouping the visual representations of the session data according to similar attributes of the states represented by the session data. Further aspects of these embodiments of the present invention may include providing personalization services (e.g., recommendations and search results) based on saved communication session states.

FIG. 1 is a network diagram depicting a network system 100, according to one embodiment, having a client-server architecture configured for exchanging data over a network. The network system 100 may include a network-based content publisher 102 in communication with a client device 106 and a third party server 114. In some example embodiments, the network-based content publisher 102 may be a network-based marketplace.

The network-based content publisher 102. may communicate and exchange data within the network system 100 that may pertain to various functions and aspects associated with the network system 100 and its users. The network-based content publisher 102 may provide server-side functionality, via a network 104 (e.g., the Internet), to one or more client devices (e.g., client device 106). The one or more client devices may be operated by users that use the network system 100 to exchange data over a network 104. These transactions may include transmitting, receiving (communicating), and processing data to, from, and regarding content and users of the network system 100. The data may include, but are not limited to: images; video or audio content; user preferences; product and service feedback, advice, and reviews; product, service, manufacturer, and vendor recommendations and identifiers; product and service listings associated with buyers and sellers; product and service advertisements; auction bids; transaction data; and social data among other things.

In various embodiments, the data exchanged within the network system 100 may be dependent upon user-selected functions available through one or more client or user interfaces (UIs). The UIs may be associated with a client device, such as the client device 106 using web client 108. The web client 108 may be in communication with the network-based content publisher 102 via a web server 118. The UIs may also be associated with one or more applications 110 executing on the client device 106, such as a client application designed for interacting with the network-based content publisher 102, applications or services hosted by the network-based content publisher 102, or the third party server 114 (e.g., one or more servers or client devices) hosting a third party application 116.

The client device 106 may be any of a variety of types of devices. For example, the client device 106 may a mobile device such as an iPhone® or other mobile device running the iOS® operating system, the Android® operating system, a BlackBerry® operating system, the Microsoft Windows'® Phone operating system, Symbian® OS, or webOS®. Consistent with some embodiments, the client device 106 may alternatively be a tablet computer, such as an iPad® or other tablet computer running one of the aforementioned operating systems. In some embodiments, the client device 106 may also be a personal digital assistant (PDA), a personal navigation device (PND), a handheld computer, a desktop computer, a laptop or netbook, a set-top box (STB) such as provided by cable or satellite content providers, a wearable computing device such as glasses or a wristwatch, a multimedia device embedded in an automobile, a Global Positioning System (GPS) device, a data enabled book reader, or a video game system console such as the Nintendo Wii®, the Microsoft Xbox 360®, or the Sony Play Station 3®, or other video game system consoles.

The client device 106 may interface via a connection 112 with the communication network 104 (e.g., the Internet or wide area network (WAN)). Depending on the form of the client device 106, any of a variety of types of connection 112 and communication networks 104 may be used. For example, the connection 112 may be Code Division Multiple Access (CDMA) connection, a Global System for Mobile communications (GSM) connection, or other type of cellular connection. Such a connection 112 may implement any of a variety of types of data transfer technology, such as Single Carrier Radio Transmission Technology (1×RTT), Evolution-Data Optimized (ENDO) technology, General Packet Radio Service (GPRS) technology, Enhanced Data rates for GSM Evolution (EDGE) technology, or other data transfer technology (e.g., fourth generation wireless, 4G networks). When such technology is employed, the communication network 104 may include a cellular network that has a plurality of cell sites of overlapping geographic coverage, interconnected by cellular telephone exchanges. These cellular telephone exchanges may be coupled to a network backbone (e.g., the public switched telephone network (PSTN), a packet-switched data network, or to other types of networks).

In another example, the connection 112 may be Wireless Fidelity (Wi-Fi, IEEE 802.11x type) connection, a Worldwide Interoperability for Microwave Access (WiMAX) connection, or another type of wireless data connection. In such an embodiment, the communication network 104 may include one or more wireless access points coupled to a local area network (LAN), a WAN, the Internet, or other packet-switched data network. In yet another example, the connection 112 may be a wired connection, for example an Ethernet link, and the communication network 104 may be a LAN, a WAN, the Internet, or other packet-switched data network. Accordingly, a variety of different configurations are expressly contemplated.

FIG. 1 also illustrates the third party application 116 executing on the third party server 114 that may offer one or more services to users of the client device 106. The third party application 116 may have programmatic access to the network-based content publisher 102 via the programmatic interface provided by an application program interface (API)

server 120. In some embodiments, the third party application 116 may be associated with any organization that may conduct transactions with or provide services to the users of the client device 106.

Turning specifically to the network-based content publisher 102, the API server 120 and a web server 118 are coupled to, and provide programmatic and web interfaces respectively to, an application server 122. The application server 122 may, for example, host a marketplace application 124, which may provide a number of content publishing and viewing functions and services to users that access the network-based content publisher 102. The application server 122 may further host a plurality of user accounts for users of the network-based content publisher 102, which may be stored in a database 130. As illustrated in FIG. 1, the application server 122 may also host a scratchpad application 126 which may be configured to store and generate scratchpad interfaces with session data representative of a state of a communication session. Such scratchpad interface may, for example, be presented on one of the client device 106.

As illustrated in FIG. 1, the application server 122 may be coupled via the API server 120 and the web server 118 to the communication network 104, for example, via wired or wireless interfaces. The application server 122 is, in turn, shown to be coupled to a database server 128 that facilitates access to the database 130. In some examples, the application server 122 can access the database 130 directly without the need for the database server 128. In some embodiments, the database 130 may include multiple databases that may be internal or external to the network-based content publisher 102.

The database 130 may store data pertaining to various functions and aspects associated with the network system 100 and its users. For example, user accounts for users of the network-based content publisher 102 may be stored and maintained in the database 130. Each user account may comprise user data that describes aspects of a particular user. The user data may include demographic data, user preferences, and financial information. The demographic data may, for example, include information describing one or more characteristics of a user. Demographic data may, for example, include gender, age, location information, employment history, education history, contact information, familial relations, or user interests. The financial information may, for example, include private financial information of the user such as account number, credential, password, device identifier, user name, phone number, credit card information, bank information, transaction history or other financial information which may be used to facilitate online transactions by the user. Consistent with some embodiments, the transaction history may include information related to transactions for items or services (collectively referred to as "products") that may be offered for sale by merchants using marketplace services provided by the network-based content publisher 102. The transaction history information may, for example, include a description of a product purchased by the user, an identifier of the product, a category to which the product belongs, a purchase price, a quantity, or a number of bids.

The user data may also include a record of user activity, consistent with some embodiments. Each user session may be stored in the database 130 as session data and such session data may be maintained as part of the user data about each user. Accordingly, in some embodiments, the user data may include past keyword searches that users have performed, web pages viewed by each user, products added to a user wish list or watch list, products added to an electronic shopping cart, and products that the users own. User preferences may be inferred from the user activity.

While the marketplace application 124 and the scratchpad application 126 are shown in FIG. 1 to both form part of the network-based content publisher 102, it will be appreciated that, in alternative embodiments, the scratchpad application 126 may form part of a service that is separate and distinct from the network-based content publisher 102. Further, while the system 100 shown in FIG. 1 employs client-server architecture, the present inventive subject matter is, of course, not limited to such an architecture, and could equally well find application in an event-driven, distributed, or peer-to-peer architecture system, for example. The various modules of the application server 122 may also be implemented as standalone systems or software programs, which do not necessarily have networking capabilities. It shall be appreciated that although the various functional components of the network system 100 are discussed in the singular sense, multiple instances of one of more of the various functional components may be employed.

Figure 2:
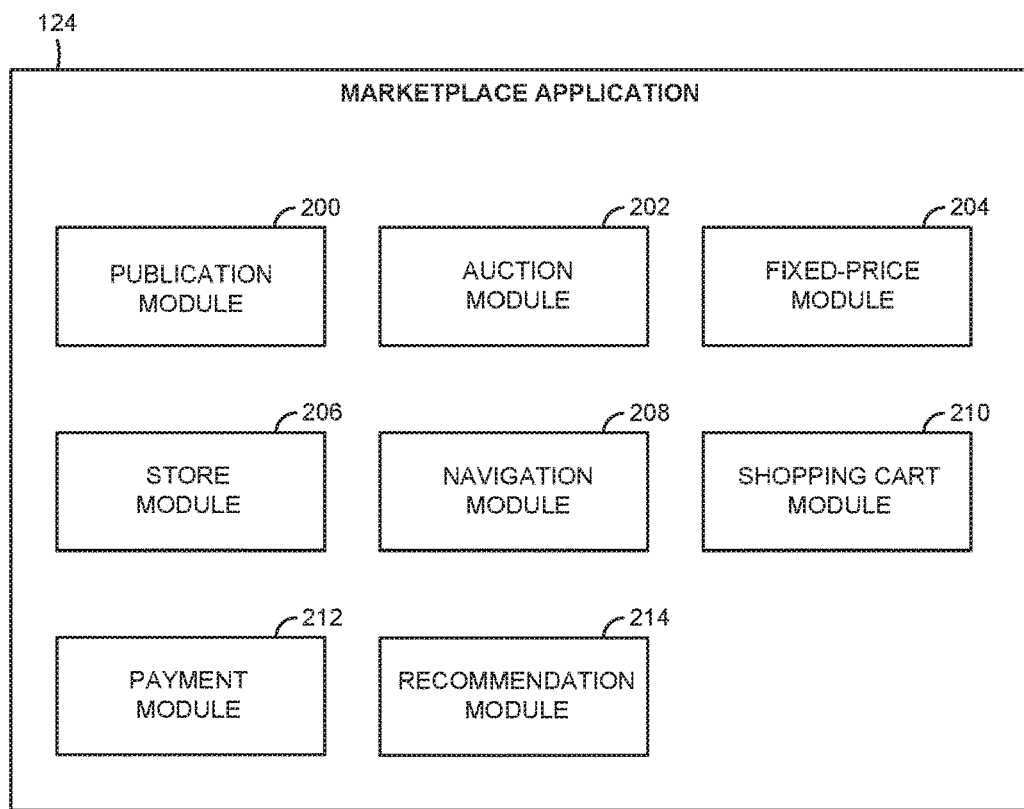
FIG. 2 is a block diagram illustrating an example embodiment of multiple modules forming a marketplace application, which is provided as part of the network system of FIG. 1.

FIG. 2 is a block diagram illustrating an example embodiment of multiple modules forming a marketplace application 124, which is provided as part of the network system 100 of FIG. 1. The modules 200-214 of the marketplace application 124 may be hosted on dedicated or shared server machines that are communicatively coupled to enable communications between server machines. Each of the modules 200-214 are communicatively coupled (e.g., via appropriate interfaces) to each other and to various data sources, so as to allow information to be passed between the modules 200-214 of the marketplace application 124 or so as to allow the modules 200-214 to share and access common data. The various modules of the marketplace application 124 may furthermore access one or more databases 130 via the database server 128 (FIG. 1).

The marketplace application 124 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace application 124 is shown to include a publication module 200 and an auction module 202, which support auction-format listing and price setting mechanisms (e.g., English, Dutch, Vickrey, Chinese, Double, Reverse auctions etc.). The auction module 202 may also provide a number of features in support of such auction-format listings, such as a reserve price feature whereby a seller may specify a reserve price in connection with a listing, and a proxy-bidding feature whereby a bidder may invoke automated proxy bidding.

A fixed-price module 204 may support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

A store module 206 may allow sellers to group their product listings (e.g., goods and/or services) within a "virtual" store, which may be branded and otherwise personalized by and for the sellers. Such a virtual store may also offer promotions, incentives, and features that are specific and personalized to a relevant seller. In one embodiment, the listings and/or transactions associated with the virtual store and its features may be provided to one or more users.

Navigation of the network-based content publisher 102 may be facilitated by a navigation module 208. For example, a search module may, inter cilia, enable key word searches of listings published via the network-based content publisher 102. A browser module may allow users, via an associated UI, to browse various category, catalogue, inventory, social network, and review data structures within the network-based content publisher 102. Various other navigation modules 208 (e.g., an external search engine) may be provided to supplement the search and browsing modules. Consistent with some embodiments, the results for key word searches of listings published via the network-based content publisher 102 may be filtered to include only listings corresponding to social network connections of the user (e.g., indicated friends and family).

In one embodiment, an electronic shopping cart module 210 is used to create an electronic shopping cart used by users of the network-based content publisher 102 to add and store products (e.g., goods and services) listed by the store module 206. The electronic shopping cart module 210 may also be used to "check out," meaning a user may purchase products in the electronic shopping cart. The electronic shopping cart module 210 may facilitate the transactions by automatically finding the products in the electronic shopping cart across at least one or all of a predefined set of vendors, a comparison shopping site, an auction site, etc. In various embodiments, the selection criteria for which vendor or vendors to purchase from may include, but are not limited to, criteria such as lowest cost, fastest shipping time, preferred or highest rated vendors or sellers, or any combination thereof.

As illustrated in FIG. 2, the marketplace application 124 may include a payment module 212 that may provide a number of payment services and functions to users. The payment module 212 may allow users to accumulate value e.g., in a commercial currency, such as the U.S. dollar, or a proprietary currency, such as "points") in accounts, and then later to redeem the accumulated value for products (e.g., goods or services) that are made available via the payment module 212. For some example embodiments, the payment module 212 generally enables transfer of values (e.g., funds, reward points, etc.) from an account associated with one party (e.g., a sender) to another account associated with another party (e.g., a receiver).

As illustrated in FIG. 2, the marketplace application 124 may include a recommendation module 214, which may provide recommendation services and functions to users. In some embodiments, the recommendation module 214 may receive requests for recommendations, and, in turn, provide a recommendation to the user based on information about the user maintained as part of the user data. In some embodiments, the recommendation module 214 may automatically generate and provide a recommendation based on the activity of the user. The recommendations provided by the recommendation module 214 may contain one or more items (e.g., products offered for sale, articles, blogs, movies, social network connections, etc.) that may potentially interest a user. The recommendations may, for example, be based on previous products purchased by the user, a web page viewed by the user, or an item given favorable feedback by the user, or communication session states saved using the scratchpad application 126.

Figure 3:
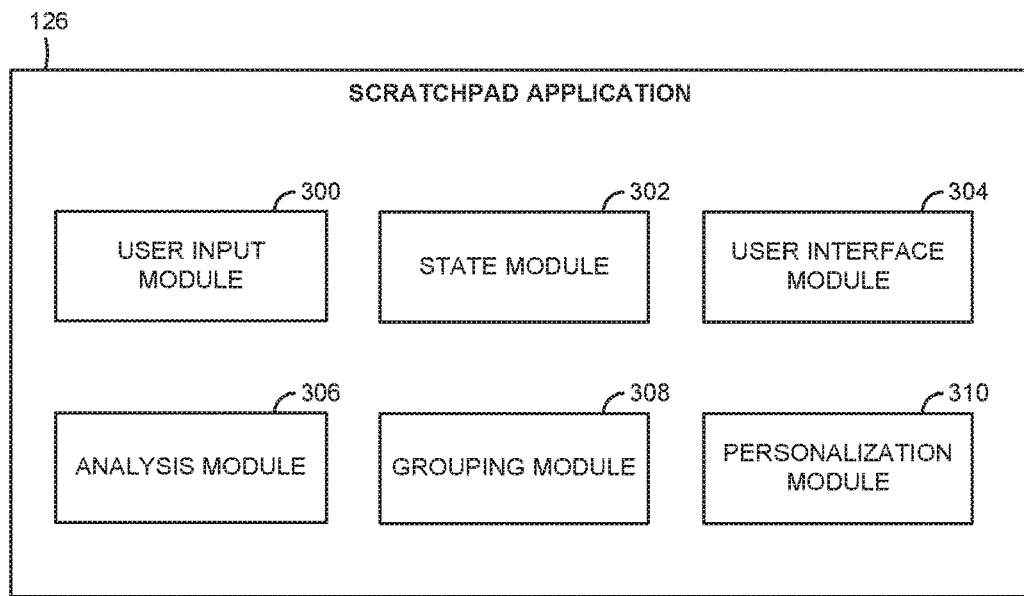
FIG. 3 is a block diagram illustrating an example embodiment of multiple modules forming a scratchpad application, which is provided as part of the network system of FIG. 1.

FIG. 3 is a block diagram illustrating an example embodiment of multiple modules forming the scratchpad application 126, which is provided as part of the network-based content publisher 102. The scratchpad application 126 is shown as including a user input module 300, a state module 302, a user interface module 304, an analysis module 306, a grouping module 308, and a personalization module 310, all configured to communicate with each other (e.g., via a bus, shared memory, a switch, or application programming interfaces (APIs)). The various modules of the scratchpad application 126 may access the databases 130 via the database server 128, and each of the various modules of the scratchpad application 126 may each be in communication with one or more third party applications 116. Further, the various modules of the scratchpad application 126 may access a machine-readable memory of the client device 106.

Consistent with some embodiments, the user input module 300 may he configured to receive user input generated by one or more input/output (I/O) devices that may be included with or communicatively coupled to the client device 106. Depending on the form of the client device, the I/O devices may, for example, be a mouse, a track pad, a keypad, a keyboard, a multi-touch sensing surface (e.g., a touchscreen or trackpad), a microphone, a speaker, a camera, and the like. The user input may be received by one of the aforementioned I/O devices and in some embodiments, transmitted to the application server 122 for receipt by the user input module 300.

The state module 302 may be configured to capture and store session data that is representative of a state of a communication session and may be used to recall the state of the communication session. Session data refers to a series of steps, events or actions performed by a user when visiting a web site or other such activity performed during a communication session while using one or more applications 110 executing on a client device (e.g., client device 106). Example session data includes events that describe the actions performed by a user when conducting an online transaction, completing an online form, taking an online survey, and participating in other online activities that involve two or more steps performed by the user.

The session data may include interactions of the client device 106 with the application server 122 such as information provided by a user, buttons (or other visual indicators) activated by the user, an identification of steps completed by the user, keystrokes, cursor and pointer movements, actions canceled by the user, and other types of clickstream data. Accordingly, the state module 302 may he configured to monitor, track, and record the activities and interactions of a user, using one or more devices (e.g., client device 106), with the various modules of the network system 100. The session data may further include contextual information (e.g., a device ID, location information, or other device data) provided by one or more applications 110 executing on a client device as part of the communication session.

The session data may include user requests transmitted to the application server 122 such as keyword search queries performed, requests for recommendations, web page view requests, requests to add a product to a user wish list, watch list or electronic shopping cart, or the like. The session data may also include responses to the user requests transmitted by the application server 122 such as keyword search results, recommendations, web pages, interfaces for a wish list, watch list or electronic shopping cart, or the like. It will be appreciated that in some embodiments, the keyword searches, recommendations and web pages may correspond to one or more listings created and maintained by the marketplace application 124.

The state module 302 may automatically capture and store the session data without further user interaction or in response to the receipt of user input (e.g., received by the user input module 300). The state module 302 may store the session data in the database 130 (e.g., as an XML-based text document), in a machine-readable medium of a client device of the user (e.g., client device 106), or both.

The user interface module 304 may be configured to generate a scratchpad interface to be presented on client devices of a user. The scratchpad interfaces generated by the user interface module 304 allow users to quickly save, access, organize, and compare items of interest. Scratchpad interfaces may be displayed in conjunction with multiple other scratchpad interfaces that are involved in a given communication session (e.g., with the client device 106). The scratchpad interfaces may include, at least, a visual representation of session data captured by the state module 302 that is representative of a state of a communication session.

Consistent with some embodiments, each scratchpad interface may include visual representations of multiple sets of session data. Depending on the users activity during a given data session, the multiple sets of session data may include both homogeneous and heterogeneous groups. For example, a homogeneous group of session data sets may include data related to a particular category of product (e.g., "digital cameras"), while a heterogeneous group of session data may include data related to products from various categories of product (e.g., a digital camera, a holiday sweater, and a toaster).

In some embodiments, the scratchpad interface may include functionality to allow a user to compare multiple items included in multiple sets of session data. In some embodiments, this functionality may be provided to users upon receiving user input (e.g., received by the user input module 300) requesting a comparison of a homogeneous group of session data sets. The comparison may include a comparison of various attributes of items included in session data. For example, the scratchpad interface may contain a homogeneous group of three sets of session data. The first set of session data may relate to a first digital camera, the second set of session data may relate to a second digital camera, and the third set of session data may relate to a third digital camera. Following this example, the state module 302 may, upon receiving appropriate user input, generate a display of the three sets of session data in a manner for convenient comparison of the three digital cameras including a comparison of a select set of attributes of each The user interface module 304 may be further configured to name each set of session data corresponding to respective communication session states. The name assigned to each set of session data may be based on user input or may be automatically assigned based on information in the session data. More particularly, the user interface module 304 may, for example, name a particular set of session data according to the type of communication session (e.g., shopping), a process flow being employed in the communication session (e.g., checkout flow), operations performed leading up to the state of the communication session (e.g., a particular search query performed), a page being viewed, or the like.

The analysis module 306 may be configured to analyze activity of a user during communication sessions to identify certain states of communication session that may be of interest. To this end, the analysis module 306 may analyze the activity of a user to learn typical process flows of the user. A "typical process flow" refers to a particular sequence of operations regularly performed by the user to achieve a particular result. Each operation of a sequence may have an ordered dependency on the other operations. A user may have a different typical process flow for each type of achievable result. For example, a user may have a typical process flow that corresponds to the purchase of an item, another typical process flow for researching information, and another typical process flow for listing an item for sale. The types of achievable results may include, but are not limited to, a completed web-based form, a completed web-based search, a completed transaction, or successfully listing an item for sale (e.g., via marketplace application 124).

As part of learning a typical process flow of a user, the analysis module 306 may identify certain inefficiencies of the user's typical process flow. For example, the analysis module 306 may determine that a user often returns to a particular state or repeats a particular operation of the sequence or a subset thereof.

Upon learning the typical process flow of a user, the analysis module 306 may determine that subsequent communication sessions involve or include a typical process flow of the user. This determination that a communication session involves or includes a typical process flow may be based on the user performing operations ordered in the manner of the typical process flow. in this manner, the analysis module 306 may be able to anticipate certain operations that a user will perform during the communication session because the analysis module 306 is aware of the operations typically performed by the user and the order of such operations. Further, the analysis module 306 may anticipate when a user is going to save a certain state of a communication session based on the user previously saving a state of a previous communication session that resulted from the performance of similar or identical operations.

The grouping module 308 may be configured to group sets of session data representing certain states of one or more communication sessions. The grouping module 308 may allow a user to group sets of session data according to the preference of the user, or in some embodiments, the grouping module 308 may automatically group the sets of session data. The grouping of sets of session data may, for example, be based on one or more similar attributes of the saved states, contextual information (e.g., timing or location information) included in the session data, or similar operations or interactions performed that resulted in the states. The grouping module 308 may also be configured to label each group of session data. Labels may be provided or edited by a user, or may be automatically determined when grouping the sets of session data.

The personalization module 310 may be configured to provide personalization services to users of the scratchpad application 126. The personalization services may include personalized recommendations or personalized search results. As such, the personalization module 310 may work in conjunction with the navigation module 208 and the recommendation module 214 to provide such personalized services. The personalization services provided by the personalization module 310 may take into account the typical process flow of a user determined by the analysis module 306. The personalization services provided by the personalization module 310 may also be based on states of communication sessions saved by the user using the scratchpad application 126.

Figure 4A:
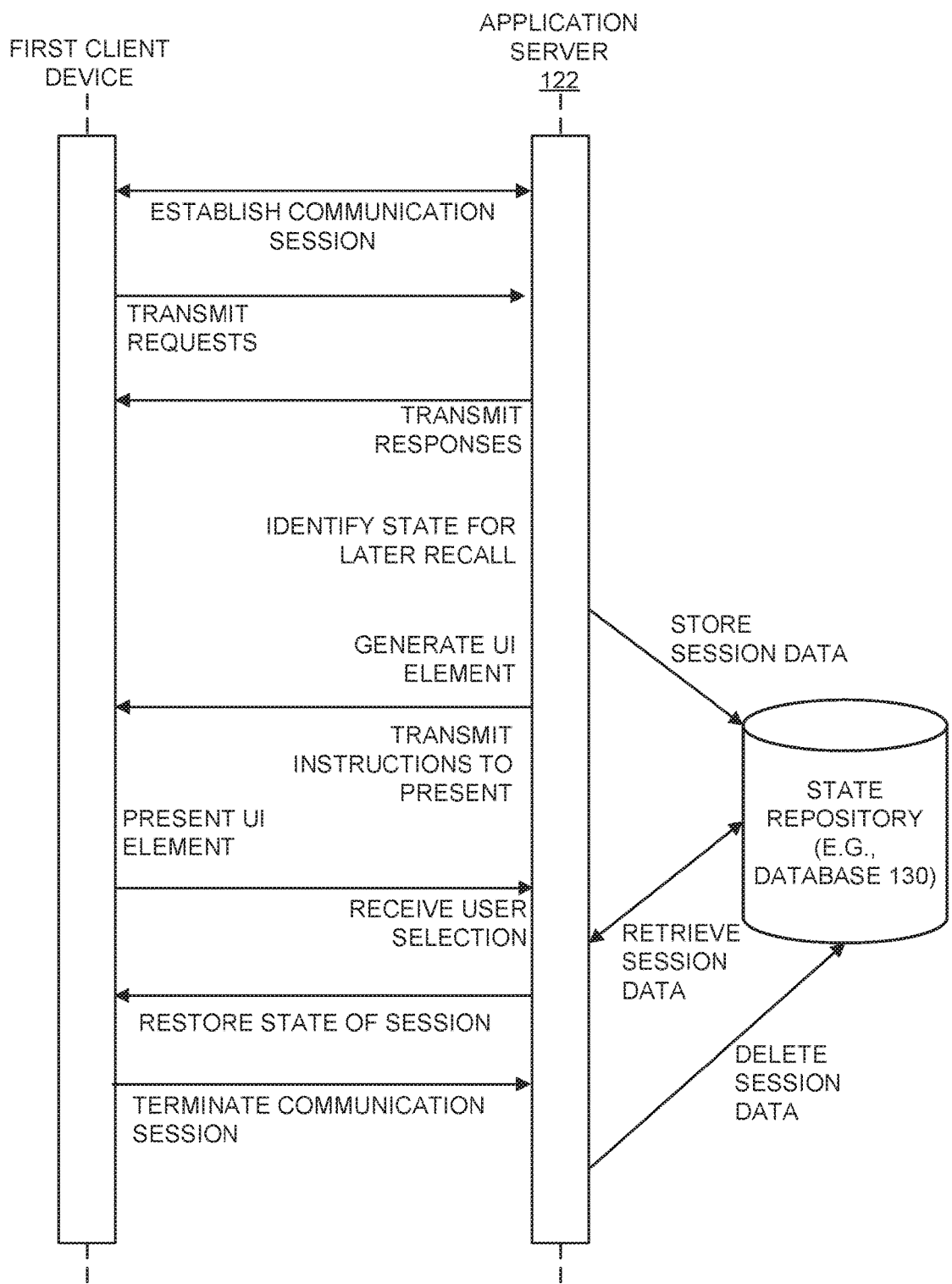
FIG. 4A is an interaction diagram depicting a communication session between a first client device and an application server, consistent with some embodiments.

FIG. 4A is an interaction diagram depicting a communication session between a first client device and an application server, consistent with some embodiments. The first client device illustrated in FIG. 4A is the first client device of at least two client devices belonging to a user and may, for example, correspond to the client device 106. As illustrated, the application server corresponds to the application server 122.

As shown, a communication session may be established between the first client device and the application server 122. In some embodiments, the user may be instructed to log in or otherwise authenticate his identity as part of establishing the communication session. The communication session may comprise multiple data exchanges over a network (e.g., communication network 104) including the transmission of a plurality of requests by the first client device received by the application server 122. The application server 122 may, in turn, transmit a plurality of responses to the first client device in response to the aforementioned plurality of requests. During the course of the communication session with the first client device, the application server 122 may select a certain state of the communication to be stored for later recall. The selection of the state may be performed automatically in anticipation of an operation or a set of operations associated with the state being repeated, consistent with some embodiments. Alternatively, the user, utilizing one of several possible I/O devices with the first client device, may signal the application server 122, through appropriate user input, to save the selected state of the communication session.

Upon selecting the state of the communication session, the application server 122 may store session data representative of the state of the data session in a session data repository (e.g., database 130 or a machine readable medium of the client device). Further, the application server 122 may generate a scratchpad interface that includes a visual representation of the state of the communication session represented by the session data. The application server 122 may then transmit instructions to the first client device that causes the client device to display the scratchpad interface.

The first client device may present the scratchpad interface in conjunction with other content involved in the continued execution of the communication session. In addition to providing a visual representation of the Mate of the communication session, the scratchpad interface presented on the first client device may allow the user to return to the state of the communication session through selection of the visual representation. As shown, the application server 122 may receive the user selection of the session data.

In response to receiving the user selection, the application server 122 may retrieve the session data from the session data repository. The application server 122 may then provide instructions to the first client device that cause the first client device to recall and return to the state of the communication session previously captured in response to the user input. In this manner, the user may revisit the prior state of the communication session.

As illustrated in FIG. 4A, the communication session between the first client device and the application server 122 may subsequently be terminated. Consistent with some embodiments, in response to terminating the communication session, the application server 122 may remove or delete the session data stored in the data session repository, at which point the session data may no longer be available for display in the scratchpad interface dining subsequent communication sessions.

Figure 4B:
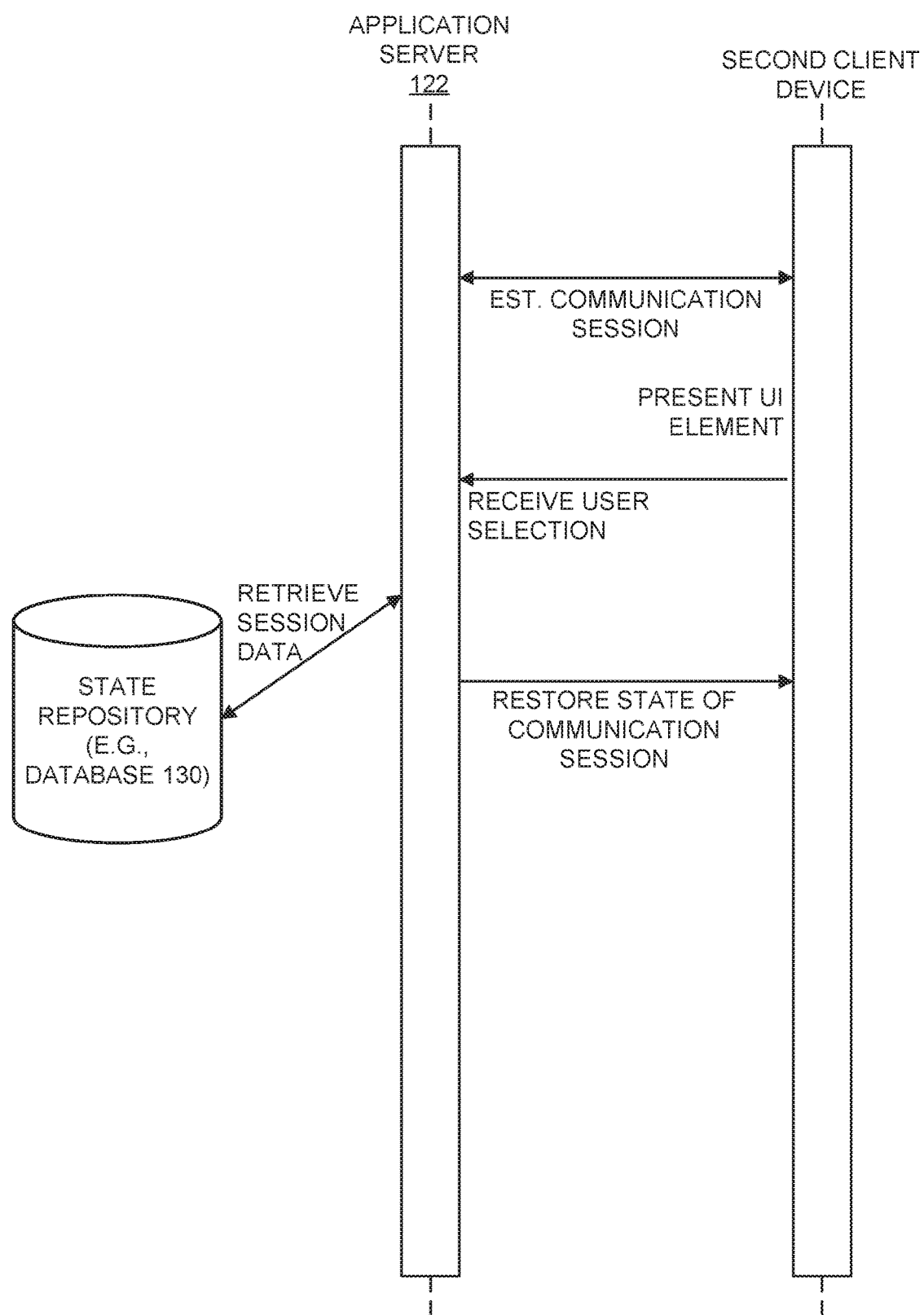
FIG. 4B is an interaction diagram depicting a communication session between a second client device and an application server, consistent with some embodiments.

FIG. 4B is an interaction diagram depicting a communication session between a second client device and an application server, consistent with some embodiments. In particular, the application server corresponds to application server 122 and the second client device is the second of at least two client devices belonging to the user discussed in FIG. 4A. Although distinct from the first client device, the second client device may also correspond to at least one possible variation of the client device 106 discussed herein. Further, the various interactions between the second client device and the application server illustrated in FIG. 4B may be performed at any point subsequent to the storing of session data discussed in FIG. 4A.

As shown in FIG. 4B, a communication session is established between the second client device and the application server 122. In some embodiments, the user may be instructed to log in or otherwise authenticate his identity as part of establishing the communication session. This authentication may provide the application server 122 with a linking between the first client device and second client device and may provide the user with access to the session data on the second client device, which was saved dining the communication session with the first client device. Further, as part of establishing the communication session, the application server may provide the second client device with instructions to present the scratchpad interface discussed in FIG. 4A.

Utilizing an I/O device of the second client device, the user may select the visual representation of the previously saved state of the communication session (discussed in FIG. 4A) displayed in the scratchpad interface. The user selection is then transmitted by the second client device and received by the application server 122. In response to receiving the user selection, the application server may retrieve the session data from the session data repository (e.g., databases 130) and transmit instructions to the second client device that cause the second client device to present the state of the communication session (e.g., originating on the first client device) represented by the session data.

Figure 5A:
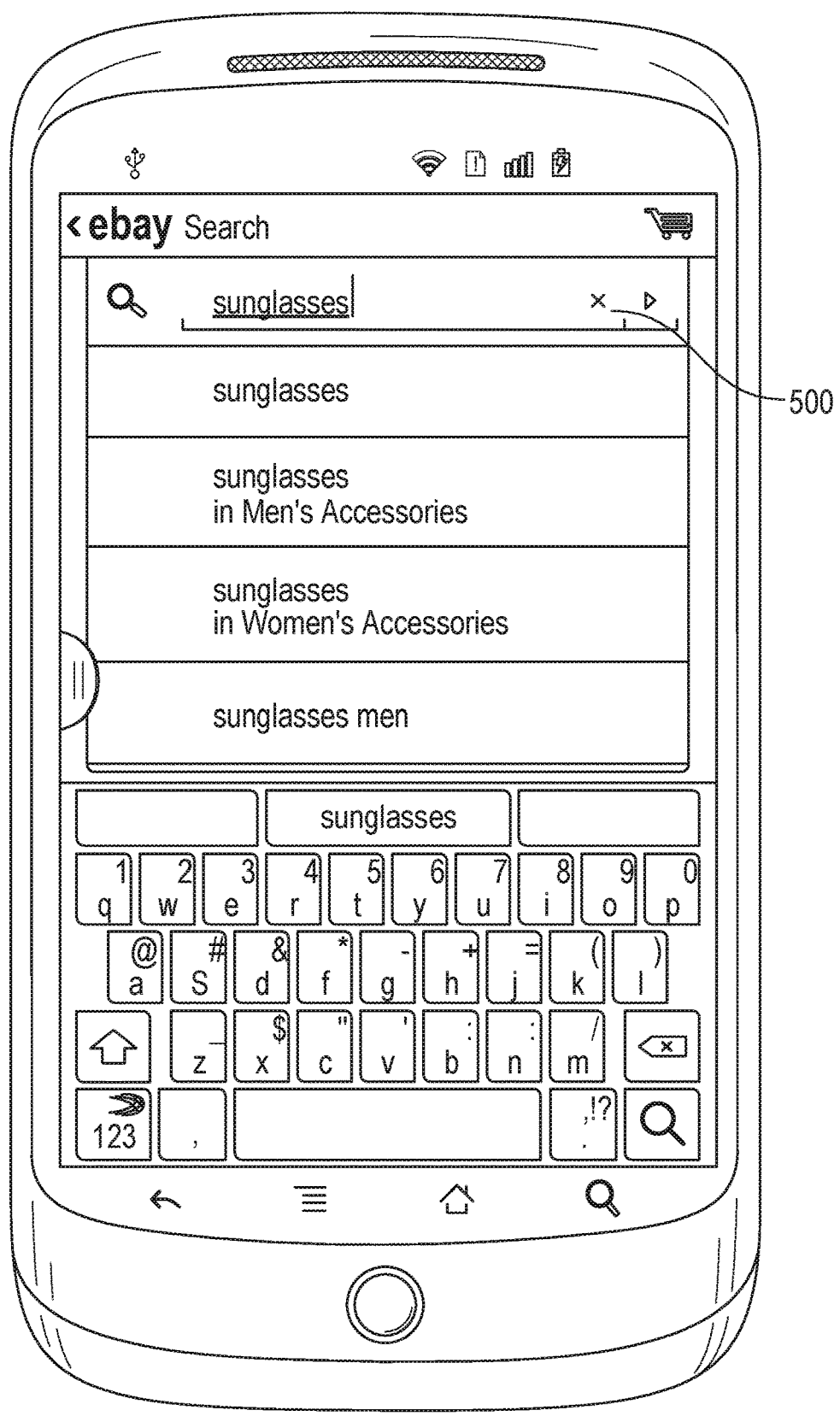
FIG. 5A is an interface diagram depicting an example communication session, consistent with some embodiments.

FIG. 5A is an interface diagram depicting an example communication session, consistent with some embodiments. Consistent with some embodiments, the example communication session may take place between the application server 122 and the client device 106 over communication network 104. As illustrated in FIG. 5A, the example communication session includes a search query 500 input by a user on an interface displayed on the client device 106 (e.g., on a touchscreen of the client device 106), which may be transmitted as a request to the application server 122.

Figure 5B:
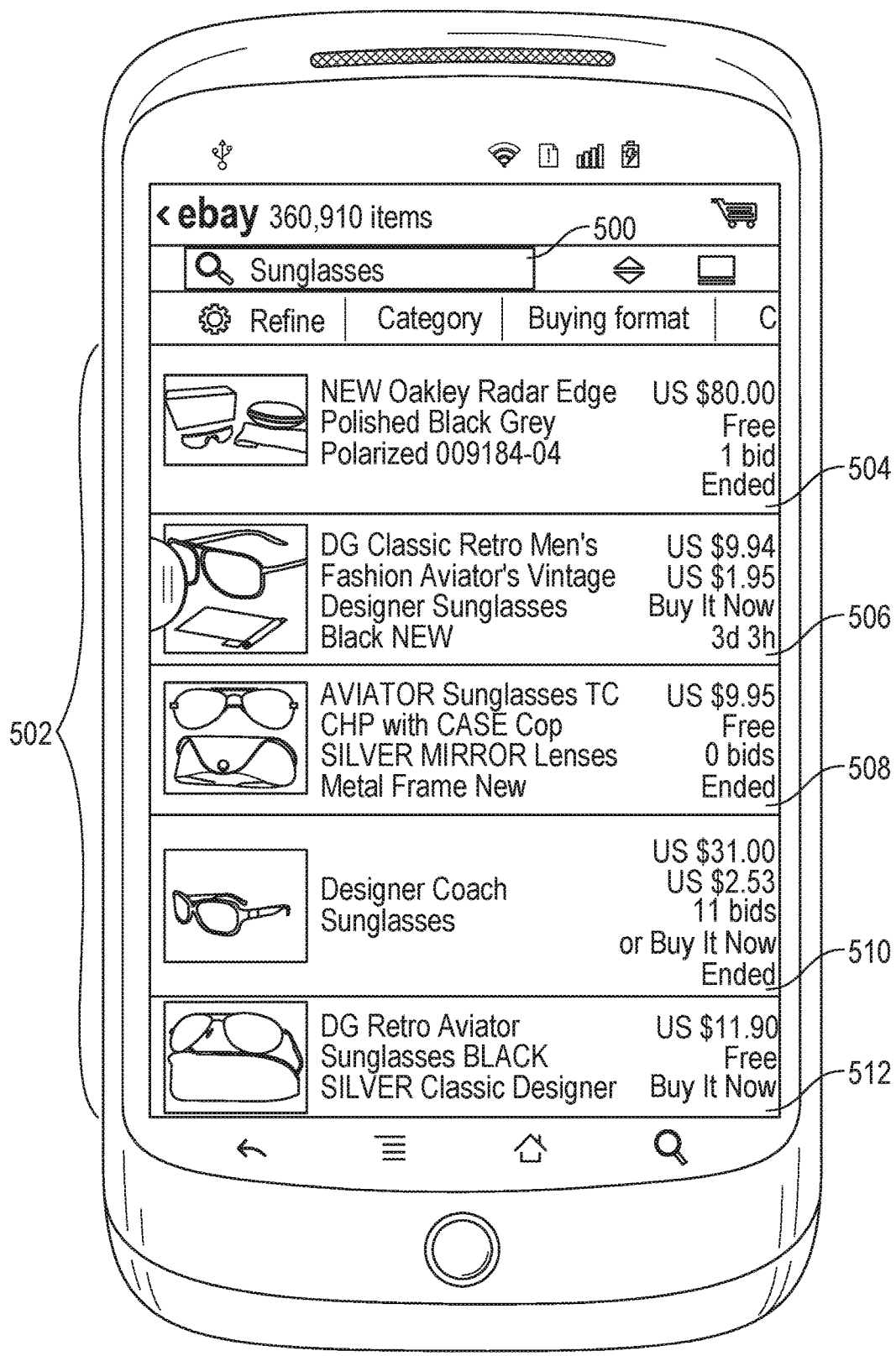
FIG. 5B is an interface diagram depicting further exchanges of the example communication session, consistent with some embodiments.

FIG. 5B is an interface diagram depicting further data exchanges of the communication session, consistent with some embodiments. As illustrated in FIG. 5B, search results 502 may be returned by the application server 122 to the client device 106 in response to receiving the search query 500. In particular, the search results 502 may include items 504-512. As shown, each of the items 504-512 may correspond to a listing for a product offered for sale (e.g., published using the marketplace application 124). Consistent with some embodiments, the user of the client device 106 may, through appropriate touch gesture (e.g., double tap), cause the scratchpad application 126 to capture and store a state of the example communication session. For example, upon viewing webpages corresponding to the items 508 and 510, the user may choose to save the respective states of the communication session at those times.

Figure 5C:
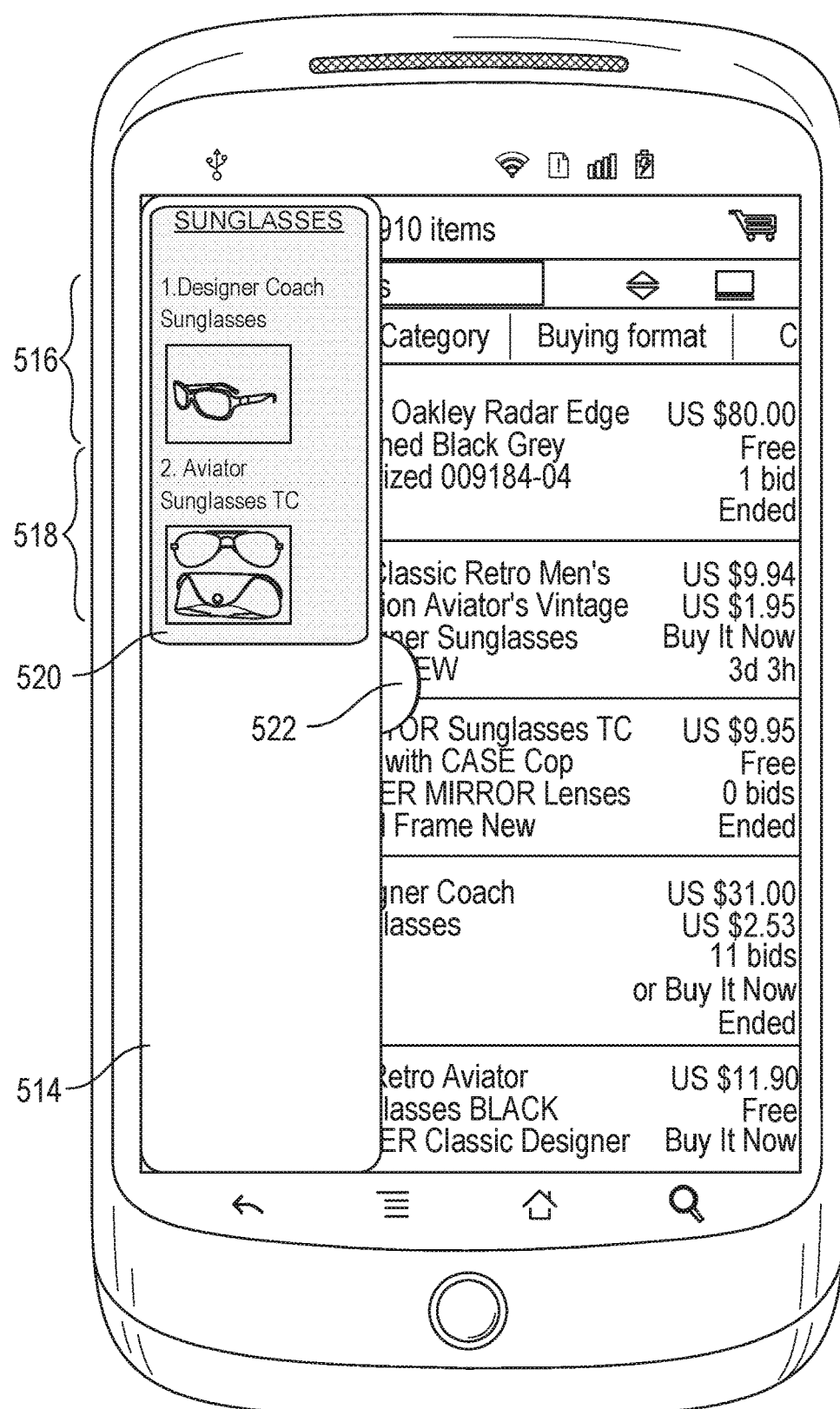
FIG. 5C is an interface diagram depicting a scratchpad interface displaying a grouped set of user interface elements representative of session data, consistent with some embodiments.

FIG. 5C is an interface diagram depicting a scratchpad interface 514 displaying visual representations of various states of the communication session, consistent with some embodiments. In particular, the scratchpad interface 514 includes elements 516 and 518, which are visual representations of session data corresponding to the state of the communication session at the time of viewing the respective webpages for items 508 and 510. The session data corresponding to elements 516 and 518 may be saved by the scratchpad application 126 in response to receiving appropriate user input while viewing the search results 502 as discussed in reference to FIG. 5B. It shall be appreciated that in some other embodiments, the session data associated with the elements 516 and 518 may be automatically saved by the state module 302 without user interaction.

As shown, each of the elements 516 and 518 may include information (e.g., a description) or content (e.g., a corresponding image) associated with each state of the communication session. Further, the elements 516 and 518 displayed on the scratchpad interface 514 may be grouped according to the methodologies discussed herein. For example, as shown, the elements 516 and 518 are displayed within group 520 based on each of the states corresponding to the elements 516 and 518 being arrived at from the search query 500 for "sunglasses." As such, the group 520 is appropriately titled "sunglasses" by the grouping module 308.

The scratchpad interface 514 may further include tab 522, which may be used to hide or expand the scratchpad interface 514. In some embodiments, the scratchpad interface 514 may be hidden or expanded via a touch gesture swipe to the left or right of the display of the client device 106. The tab 522 may also be used to move the location of the scratchpad interface 514 to the top, bottom or left of the display.

Figure 5D:
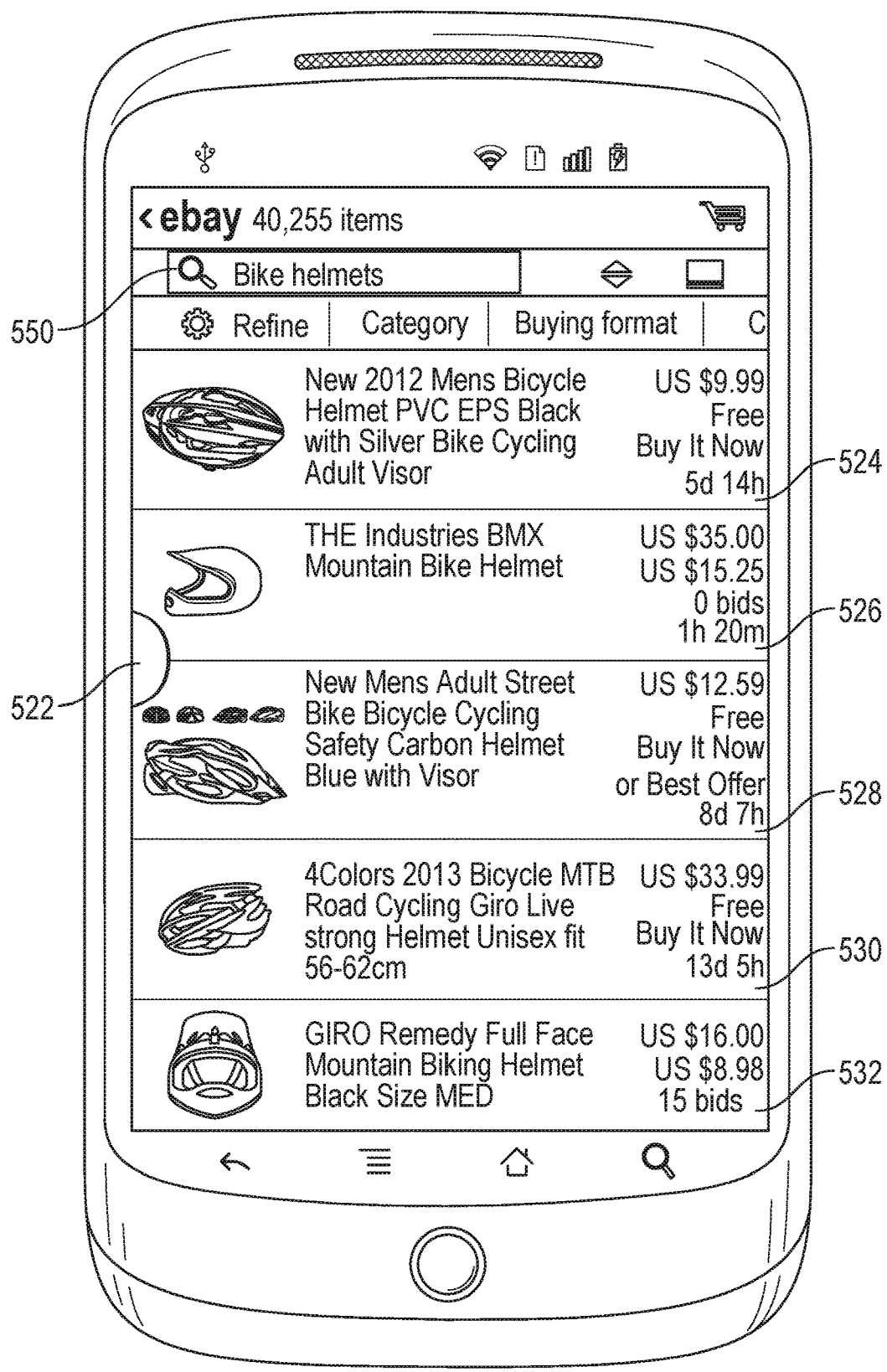
FIG. 5D is an interface diagram depicting even further exchanges of the example communication session, consistent with some embodiments.

FIG. 5D is an interface diagram depicting further exchanges of the example communication session, consistent with some embodiments. In particular, the example communication session may include a further search query 550 for "bike helmets" performed subsequent to the search query 500. The search results 524-532 may be returned by the application server 122 to the client device 106 in response to receiving the search query 550. As shown, the majority of scratchpad interface 514 may be hidden while viewing the search results 524-532. A small portion of the scratchpad interface 514 (e.g., tab 522) may, however, continue to be displayed while viewing the search results 524-532. For example, upon viewing webpages corresponding to the items 508 and 510, the user may choose to save the respective states of the communication session at those times.

Figure 5E:
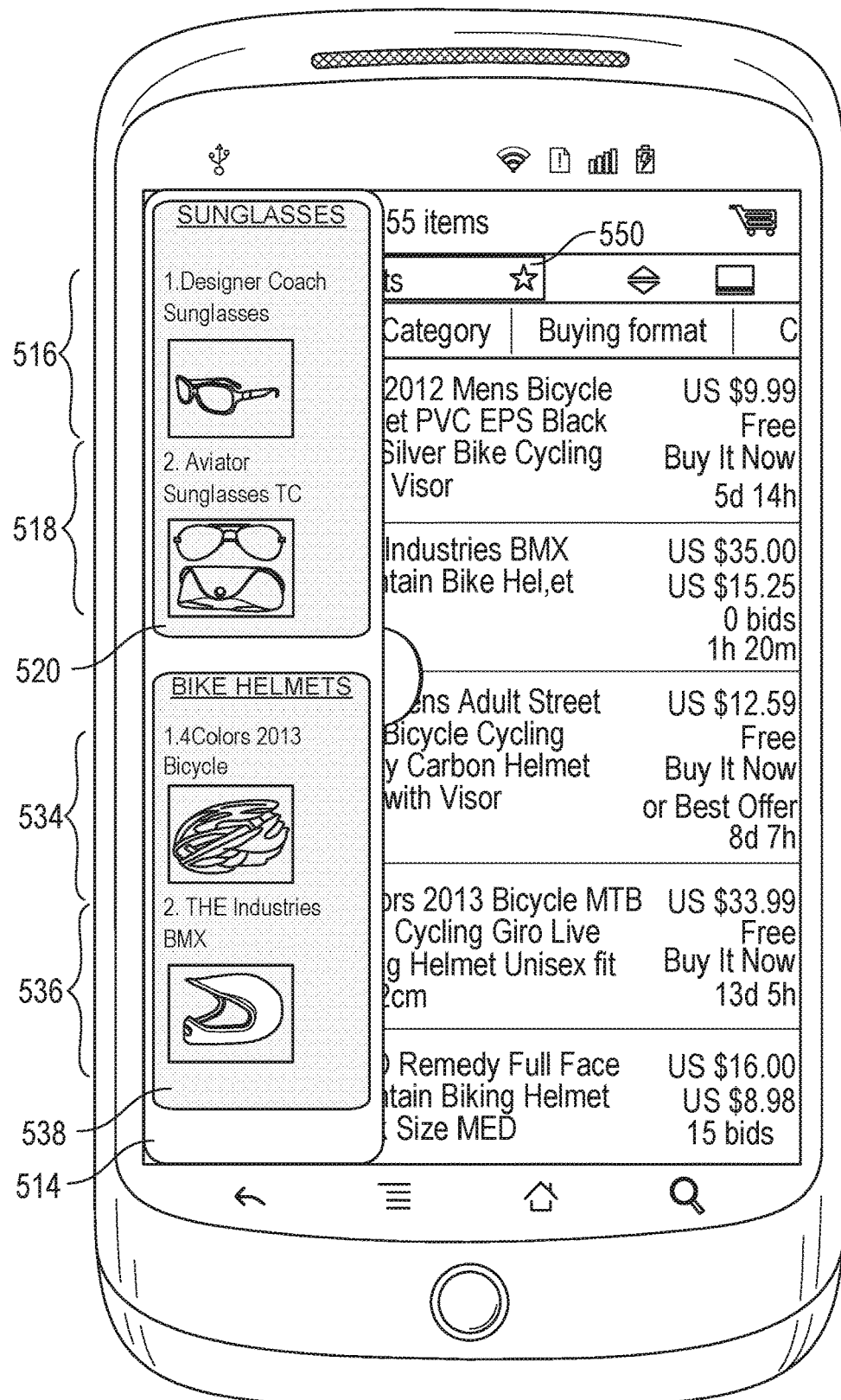
FIG. 5E is an interface diagram depicting a scratchpad interface displaying multiple grouped sets of user interface elements representative of session data, consistent with some embodiments.

FIG. 5E is an interface diagram depicting a scratchpad interface displaying multiple grouped sets of user interface elements representative of session data, consistent with some embodiments. In particular, the scratchpad interface 514 is illustrated in FIG. 5E to include elements 534 and 536 along with elements 516 and 518. The elements 534 and 536 are visual representations of session data corresponding to the state of the communication session at the time of viewing the respective webpages for items 526 and 530, respectively. As with elements 516 and 518, the session data corresponding to elements 534 and 536 may be saved by the scratchpad application 126 in response to receiving appropriate user input while viewing the items 526 and 530 or automatically without user intervention.

The elements 534 and 536 displayed on the scratchpad interface 514 may also be displayed within group 538 based on each of the states corresponding to the elements 534 and 536 being arrived at from the search query 550 for "bike helmets." As such, the group 538 is appropriately titled "bike helmets" by the grouping module 308. The grouping and labeling of the elements 534 and 536 within the group 538 may be performed by the grouping module 308 consistent with the methodologies discussed herein.

Figure 6:
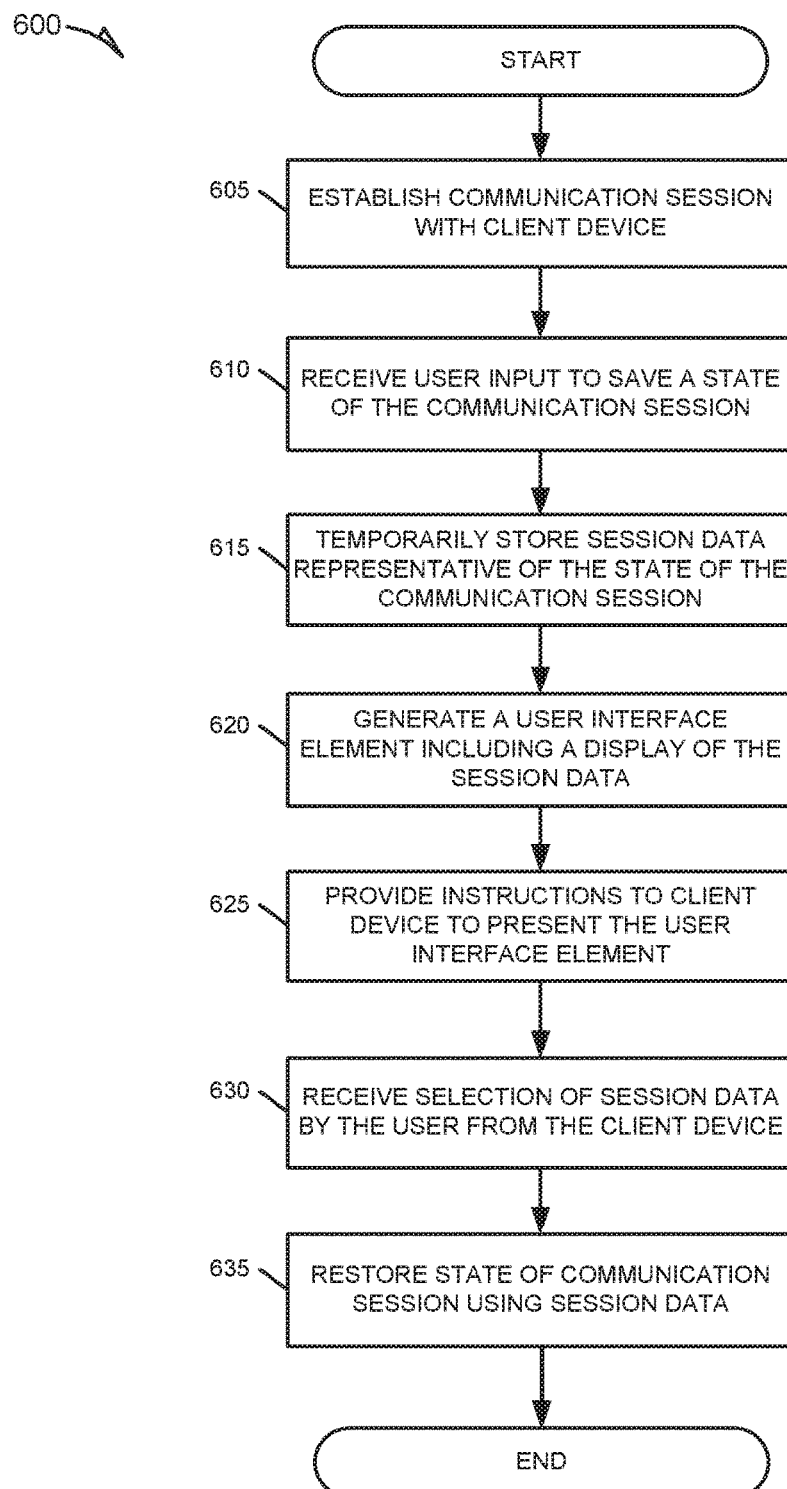
FIG. 6 is a flowchart illustrating an example method of storing and presenting a state of a communication session, consistent with some embodiments.

FIG. 6 is a flowchart illustrating an example method 600 of storing and presenting a state of a communication session, consistent with some embodiments. The method 600 may be embodied in computer-readable instructions for execution by one or more processors such that the steps of the method 600 may be performed in part or in whole by the application server 122 or the client device 106 and, in particular, the modules 300-310 comprising the scratchpad application 126.

At operation 605, a communication session may be established between the client device 106 and the application server 122. The communication session may include multiple data exchanges including a plurality of requests received from the client device 106 and a plurality of responses transmitted by the application server 122 in response to the requests. For example, a user of the client device 106 may transmit a keyword search request for products listed for sale using the marketplace application 124. In turn, the application server 122 may respond with a number of search results for products matching the user's keyword search request. At operation 610, the user input module 300 may receive user input from the client device 106 requesting that a particular state of the communication session be saved for later access. In some embodiments, the user input may be a touch gesture received on a multi-touch sensing surface of the client device 106. The touch gesture may, for example, be a tap, a double tap, a long press, a pan, a flick, a two finger tap, a pinch open, or the like.

At operation 615, the state module 302 may, in response to the receiving the user input, cause session data representative of the state of the communication session to be temporarily stored for a predetermined amount of time. The session data may be stored in the database 130, or in some embodiments, in a machine-readable medium of the client device 106 for at least a period of time (e.g., until an expiration time period has passed). Following the example from above, upon receiving the search results for products matching the user's keyword search request, the user may, for example, double tap the search results displayed on a touchscreen of the client device 106. This user input may then be provided to the user input module 300, and in response the state module 302 may capture and temporarily store the search results as session data in the database 130.

At operation 620, the user interface module 304 may generate a scratchpad interface including a visual representation of the state of the communication session represented by the session data. The scratchpad interface may present the session data (e.g., representing the state of the communication session) in a manner such that the user may select a particular set of session data, and in turn, the state of the communication session represented by the session data may be restored. The scratchpad interface may further allow a user to compare sets of session data and certain items contained therein. Following the example above, the user interface module 304 may generate a scratchpad interface that includes a textual detail of a selection of the search results.

At operation 625, the user interface module 304 may provide instructions to the client device 106, which cause the device to present the scratchpad interface. The scratchpad interface may be displayed in conjunction with other content related to the communication session, consistent with some embodiments. Consistent with some embodiments, the visual representation of the session data may include a link or other interactive element that when activated through user input causes the client device 106 to return to the state of the communication session represented by the session data. As illustrated in FIG. 6, the method 600 may include optional operations 630 and 635. At operation 630, a selection of session data (e.g., a hyperlink) made by the user may be received by the user input module 300. In response to the user selection (e.g., activating the hyperlink), the state of the communication session represented by the session data may be restored at operation 635. Following the example from above, the scratchpad presented on the client device 106 may include a hyperlink, which when selected by the user, causes the client device 106 to return to the original search query results page.

Figure 7:
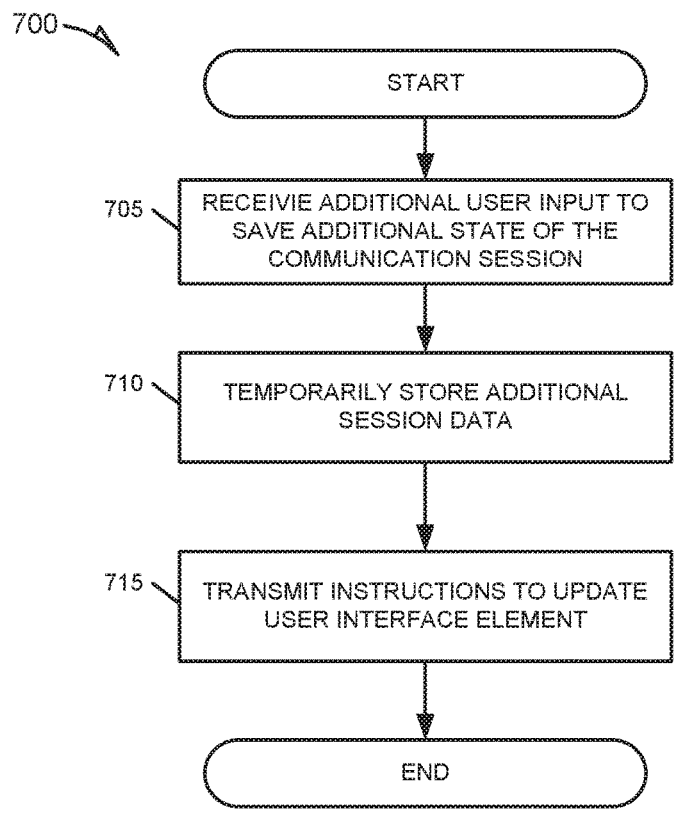
FIG. 7 is a flowchart illustrating an example method for storing an additional state of the communication session, consistent with some embodiments.

FIG. 7 is a flowchart illustrating an example method for storing additional session data, consistent with some embodiments. The method 700 may be embodied in computer-readable instructions for execution by one or more processors such that the steps of the method 700 may be performed in part or in whole by the application server 122 or the client devices 106 and 108 and, in particular, the modules 300-310 comprising the scratchpad application. Further, the method 700 may commence subsequent to the completion of method 600, consistent with some embodiments.

At operation 705, the user input module 300 may receive an additional user input to save an additional state of the communication session that is distinct from the state represented by the session data stored at operation 615 of method 600. The user input may be received in accordance with the methodologies discussed above in reference to method 600. In response to receipt of the user input, the state module 302 may cause additional session data representative of the additional state of the communication session to be temporarily stored at operation 710. The additional session data may be temporarily stored in the database 130, or in some embodiments, in a machine-readable medium of the client device 106. The additional session data may be stored until an expiration time period has passed. At operation 715, the user interface module 304 may transmit instructions to the client device 106 that cause the scratchpad interface to be updated to include visual representations of the additional session data.

Following the example presented in reference to FIG. 6, the user may continue the communication session on the client device 106 with the application server 122 and in doing so perform an additional keyword search for another product. Upon receiving the search results at the client device 106 from the application server 122, the user may save the additional state of the communication session by again double tapping the search results. In response to the user input, the state module 302 may cause session data representative of the additional search results to be temporarily saved. Further, the scratchpad interface may by updated by the user input module 300 to include the additional search results.

Figure 8:
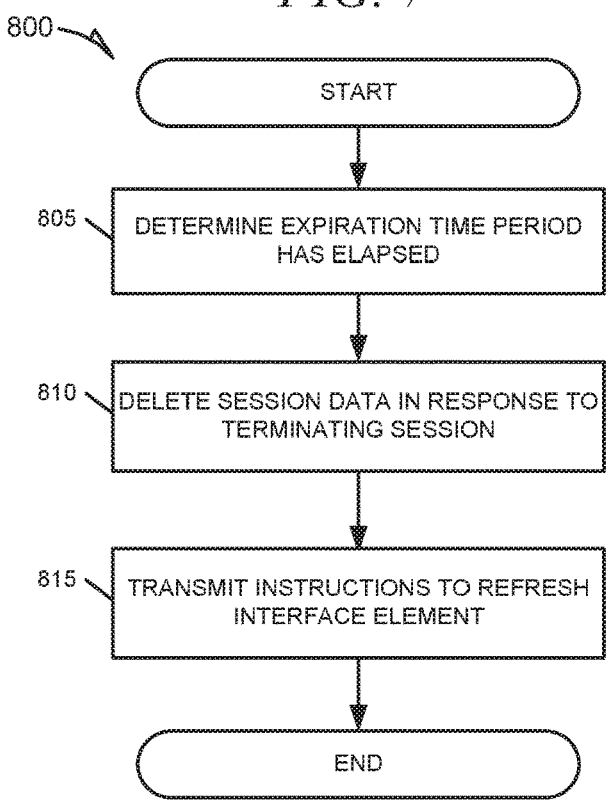
FIG. 8 is a flowchart illustrating an example method for deleting session data representative of a state of the communication session, consistent with some embodiments.

FIG. 8 is a flowchart illustrating an example method 800 for deleting session data, consistent with some embodiments. The method 800 may be embodied in computer-readable instructions for execution by one or more processors such that the steps of the method 800 may be performed in part or in whole by the application server 122 or the client devices 106 and, in particular, the modules 300-310 comprising the scratchpad application 126. Further, the method 800 may commence subsequent to the completion of methods 600 or 700, consistent with some embodiments.

Consistent with some embodiments, the state module 302 may cause session data to be temporarily stored in the database 130 until an expiration time period has elapsed. At operation 805, the state module 302 may determine that the expiration time period has elapsed. Consistent with some embodiments, the expiration time period may be the duration of the communication session, and in such embodiments, the operation 805 comprises determining that the communication session has terminated. In some embodiments, the expiration time period may be a default value or a value set by a user.

At operation 810, the state module 302 may cause the stored session data to be deleted in response to determining that the expiration time period has elapsed. In some embodiments, if the client device 106 is still engaged in a communication session, the user interface module 304 may, at operation 815, transmit instructions to the client device 106 that cause the client device 106 to refresh the scratchpad interface. Upon being refreshed, the scratchpad interface will no longer include visual representations of the session data for which the expiration time period has elapsed, and in turn, the user may no longer return to the state of the communication session represented by the expired session data.

Figure 9:
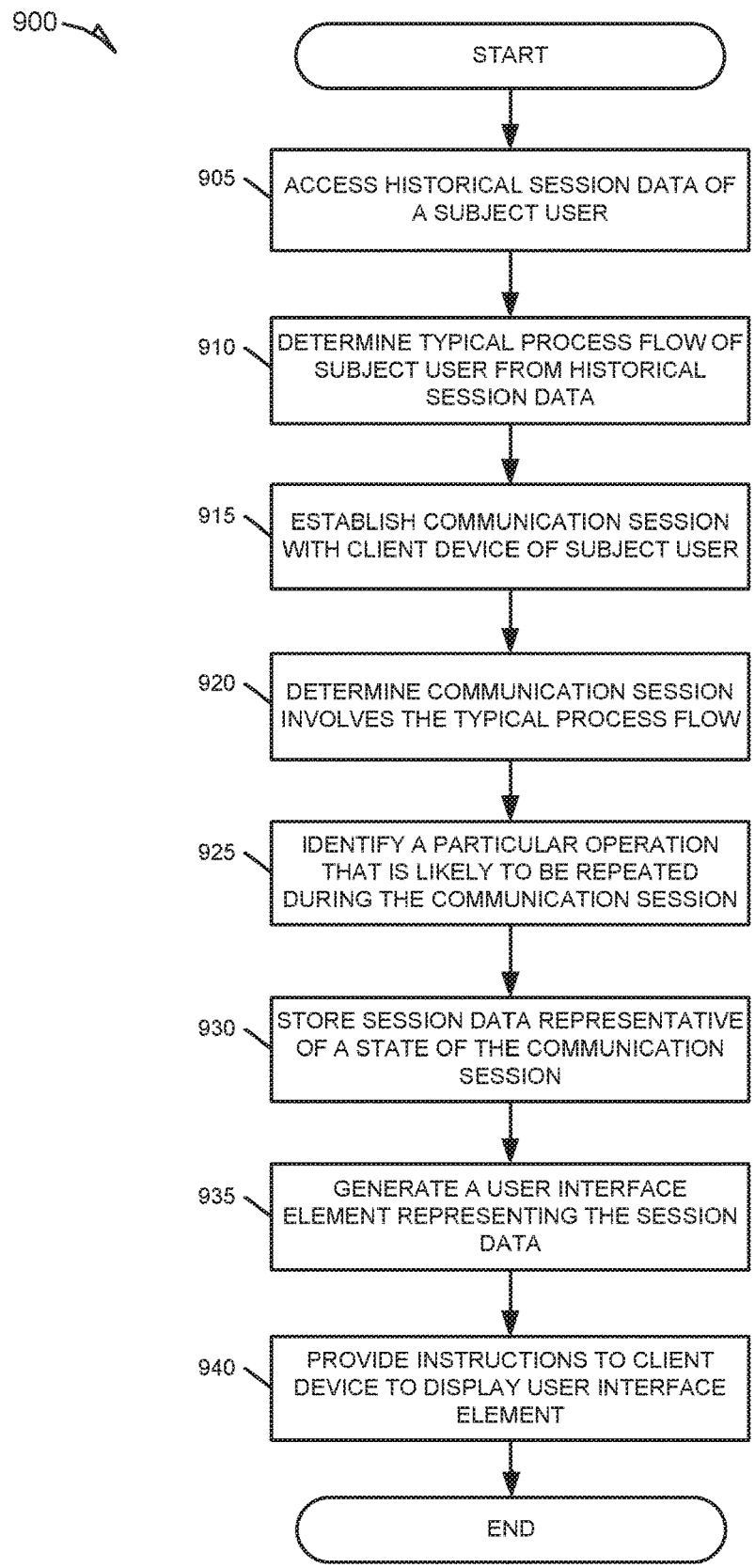
FIG. 9 is a flowchart illustrating an example method for automatically storing a state of a communication session, consistent with some embodiments.

FIG. 9 is a flowchart illustrating an example method 900 for automatically storing a state of a communication session, consistent with some embodiments. The method 900 may be embodied in computer-readable instructions for execution by one or more processors such that the steps of the method 900 may be performed in part or in whole by the application server 122 or the client devices 106 and, in particular, the modules 300-310 comprising the scratchpad application 126.

At operation 905, the analysis module 306 may access historical session data of a subject user. The historical session data pertains to previous communication sessions between various client devices of the subject user and the application server 122. From the historical session data, the analysis module may determine a typical process flow of the subject user, at operation 910. The typical process flow is a sequence of operations regularly performed by the subject user to achieve a particular result. For example, a typical process flow of the subject user for purchasing items from a network-based marketplace (also referred to as a "checkout flow") may include performing a search query, reviewing at least three results, performing a more refined search query, reviewing at least one additional result, adding at least one item to an electronic shopping cart, and completing a purchase of the at least one item. It shall be appreciated that the operations 905 and 910 may not be performed in some embodiments.

At operation 915, the application server 122 may establish a communication session with the client device 106 being operated by the client user. Upon initiating the session with the application server 122, the subject user may be prompted to login or otherwise authenticate his identity so as to provide the application server 122 with a linking of the subject user to the historical session data and the typical process flow learned at operation 910. At operation 920, the analysis module 306 may determine that the communication session involves the typical process flow of the user. This determination may be based on the operations performed by the user coinciding with the operations of the typical process flow. In some embodiments, the determination may be based on contextual information provided by the client device 106 to the application server 122.

Given the knowledge of the operations regularly performed by the subject user, and the order in which they are performed, the analysis module 306 may be able to anticipate the operations the subject user will perform including those that are repeated. In this manner, the analysis module 306 may identify a particular operation that is likely to be repeated based on the typical process flow of the subject user, at operation 925. Consistent with some embodiments, the identification of the particular operation may be based on inefficiencies in the typical process flow that arise from the user routinely returning to a previous operation in the sequence of operations comprising the typical process flow. In some embodiments, the identification of the particular operation may be based on an amount of time spent in a certain state, which, given the typical process flow of the subject user, may indicate that the subject user is likely to return to that state (e.g., by repeating the operations that lead to the state).

At operation 930, the state module 302 may cause session data representative of the state of the communication session to be stored for a predetermined amount of time. The session data may be stored in the database 130, or in some embodiments, in a machine-readable medium of the client device 106. At operation 935, the user interface module 304 may generate a scratchpad interface that includes a visual representation of the state of the communication session represented by the session data, in accordance with the methodologies discussed herein. At operation 940, the user interface module 304 may provide instructions to the client device 106 that cause the client device 106 to present the scratchpad interface.

Figure 10:
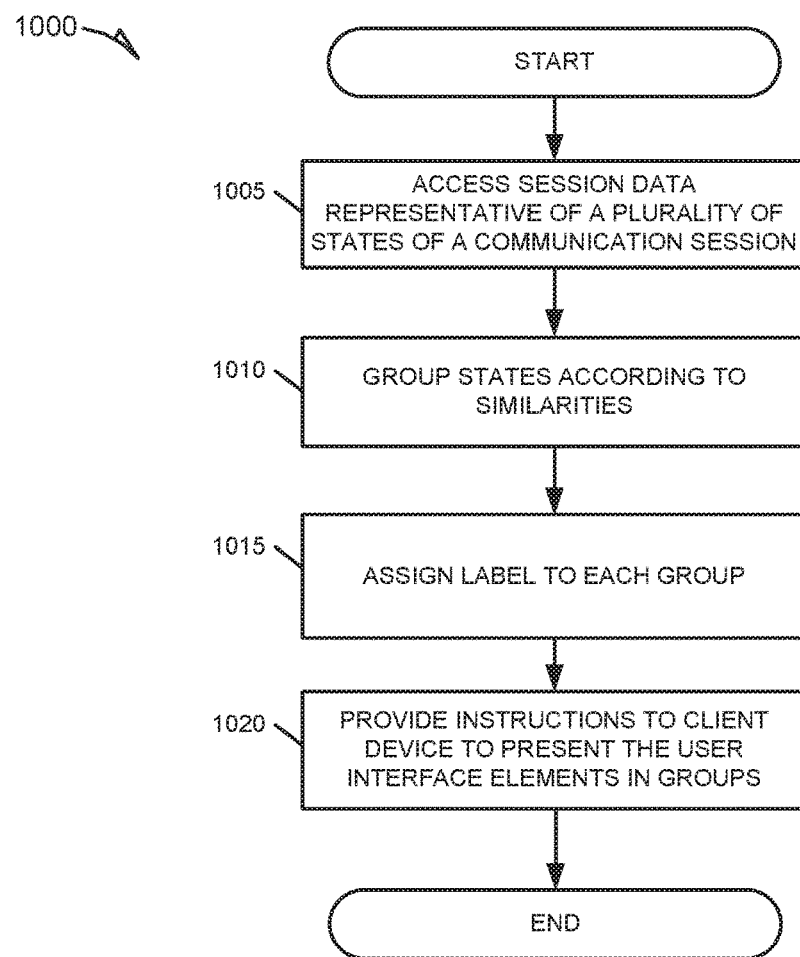
FIG. 10 is a flowchart illustrating an example method for grouping user interface elements representing states of a communication session, consistent with some embodiments.

FIG. 10 is a flowchart illustrating an example method 1000 for grouping user interface elements representing states of a communication session, consistent with some embodiments. The method 1000 may be embodied in computer-readable instructions for execution by one or more processors such that the steps of the method 1000 may be performed in part or in whole by the application server 122 or the client devices 106 and, in particular, the modules 300-310 comprising the scratchpad applications 126.

At operation 1005, the grouping module 308 may access multiple sets of session data representative of a plurality of states of a communication session. The multiple sets of session data may correspond to states of the communication session saved by a user or automatically by the scratchpad application 128. At operation 1010, the grouping module 308 may group the plurality of states according to similarities amongst each of the states. The grouping may be performed in response to user input or automatically, without user intervention. The grouping may, for example, be based on a similar operation or set of operations performed that lead to the states, states being part of a typical process flow, or common attributes in the session data representing the states.

At operation 1015, the grouping module 308 may assign a label to each group of states. The label may be based on user input, or may be determined automatically based on the grouping. For example, in instances in which the states are grouped based on a common attribute, the grouping module 308 may assign a label to the group using the common attribute. At operation 1020, the user interface module 304 may provide instructions to the client device 106, which cause the device to present a scratchpad interface with visual representations of the multiple sets of session data presented within the groupings determined at operation 1010.

Modules, Components and Logic

Certain embodiments are described herein as including logic or a number of components, modules, or mechanisms. Modules may constitute either software modules e a code embodied on a machine-readable medium or in a transmission signal) or hardware modules. A hardware module is a tangible unit capable of performing certain operations and may be configured or arranged in a certain manner. in example embodiments, one or more computer systems (e.g., a standalone, client, or server computer system) one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a FPGA, or an ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not he configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may he regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 11:
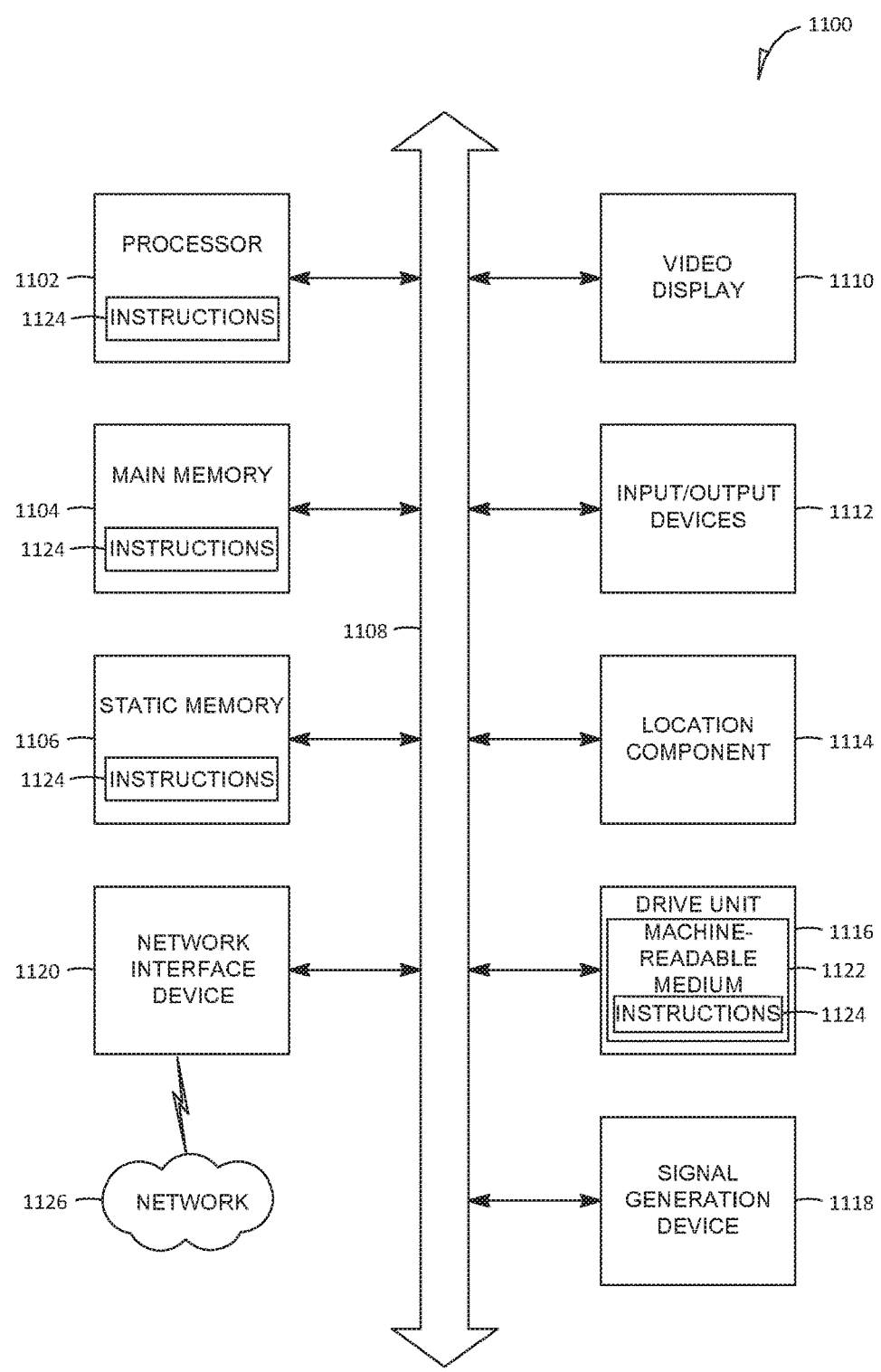
FIG. 11 is a diagrammatic representation of a machine in the example form of a computer system within which a set of instructions for causing the machine to perform any one or more of the methodologies discussed herein may be executed.

FIG. 11 is a diagrammatic representation of a machine in the example form of a computer system 1100 within which a set of instructions 1124 for causing the machine to perform any one or more of the methodologies discussed herein may be executed. The computer system 1100 may correspond to client device 106, third party server 114, or application server 122, consistent with sonic embodiments. In alternative embodiments, the machine operates as a standalone device or may he connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a smart phone (e.g., iPhone®), a tablet computer, a web appliance, a network router, switch or bridge, or any machine capable of executing instructions (sequential or otherwise) that specify. actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes one or more input/output (I/P) devices 1112, a location component 1114, a disk drive unit 1116, a signal generation device 1118 (e.g., a speaker), and a network interface device 1120. The I/O devices 1112 may, for example, include a keyboard, a mouse, a keypad, a multi-touch surface (e.g., a touchscreen or track pad), a microphone, a camera, and the like.

The location component 1114 may be used for determining a location of the computer system 1100. In some embodiments, the location component 1114 may correspond to a GPS transceiver that may make use of the network interface device 1120 to communicate GPS signals with a GPS satellite. The location component 1114 may also be configured to determine a location of the computer system 1100 by using an interact protocol (IP) address lookup or by triangulating a position based on nearby mobile communications towers. The location component 1114 may be further configured to store a user-defined location in main memory 1104 or static memory 1106. In some embodiments, a mobile location enabled application may work in conjunction with the location component 1114 and the network interface device 1120 to transmit the location of the computer system 1100 to an application server or third party server for the purpose of identifying the location of a user operating the computer system 1100.

In some embodiments, the network interface device 1120 may correspond to a transceiver and antenna. The transceiver may be configured to both transmit and receive cellular network signals, wireless data signals, or other types of signals via the antenna, depending on the nature of the computer system 1100.

Machine-Readable Medium

The disk drive unit 1116 includes a machine-readable medium 1122 on which is stored one or more sets of data structures and instructions 1124 (e.g., software) embodying or used by any one or more of the methodologies or functions described herein. The instructions 1124 may also reside, completely or at least partially, within the main memory 1104, static memory 1106, and/or within the processor 1102 during execution thereof by the computer system 1100, with the main memory 1104 and the processor 1102 also constituting machine-readable media.

Consistent with some embodiments, the instructions 1124 may relate to the operations of an operating system (OS). Further, the instructions 1124 may relate to operations performed by applications (commonly known as "apps"), consistent with some embodiments. One example of such an application is a mobile browser application that displays content, such as a web page or a user interface using a browser.

While the machine-readable medium 1122 is shown in an example embodiment to be a single medium, the term "machine-readable medium" may include a single medium or multiple media (e.g., a centralized or distributed database, and/or associated caches and servers) that store the one or more data structures or instructions 1124. The term "machine-readable medium" shall also be taken to include any tangible medium that is capable of storing, encoding, or carrying instructions (e.g., instructions 1124) for execution by the machine and that cause the machine to perform any one or more of the methodologies of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., erasable programmable read-only memory (EPROM) electrically erasable programmable read-only memory (EEPROM)) and flash memory devices; magnetic disks such as internal hard disks and removable disks; magneto-optical disks; and CD-ROM and DVD-ROM disks.

Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium that is capable of storing, encoding, or carrying instructions 1124 for execution by the machine, and includes digital or analog communications signals or other intangible media to facilitate communication of such software.

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. in the appended claims, the terms "including" and "in which" are used as the plain-English equivalents of the respective terms"comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

What is claimed:

1. A system comprising:
   one or more processors of a machine;
   a non-transitory machine-readable medium storing instructions that, when executed by the one or more processors, causes to machine to perform operations comprising:
   establishing a communication session with a client device operated by a subject user;

in response to receiving user input, storing first session data representative of a first state of the communication session, the first state of the communication session including a presentation of content within a user interface displayed on the client device, the content including an image;

grouping the first session data with second session data representative of a second state of the communication session;

updating the user interface to include an interface element presented in conjunction with the presentation of content, the interface element comprising:

a first selectable element comprising the image corresponding to the first state of the communication session, the first selectable element operable to recall the first state of the communication session in response to selection of the first selectable element, a second selectable element corresponding to the second state of the communication session, a label assigned to the grouping of the first and second session data, and a third selectable element to hide the interface element; and in response to receiving user input indicative of an interaction with the third selectable element, hiding the display of the interface element in the user interface while maintaining the presentation of content.

2. The system of claim 1, wherein the operations further comprise providing instructions to the client device that cause the client device to recall the first state of the communication session in response to user selection of the first selectable element.

3. The system of claim 1, wherein the first session data includes data representative of at least one of:

the subject user completing a web-based form, the subject user completing a web-based search, the subject user completing a transaction for an item, or the subject user listing an item for sale.

4. The system of claim 1, wherein the grouping of the first session data with the second session data is based on one or more similarities between the first and second state of the communication session.

5. The system of claim 1, wherein the label assigned to the grouping is based on a user specified label.

6. A method comprising:

establishing a communication session with a client device operated by a subject user;

in response to receiving user input, storing first session data representative of a first state of the communication session, the first state of the communication session including a presentation of content within a user interface displayed on the client device, the content including an image;

grouping, by one or more processors of a machine, the first session data with second session data representative of a second state of the communication session; and updating the user interface to include an interface element presented in conjunction with the presentation of content, the interface element comprising:

a first selectable element comprising the image corresponding to the first state of the communication session, the first selectable element operable to recall the first state of the communication session in response to selection of the first selectable element, a second selectable element corresponding to the second state of the communication session, a label assigned to the grouping of the first and second session data, and a third selectable element to hide the interface element; and in response to receiving user input indicative of an interaction with the third selectable element, hiding the display of the interface element in the user interface while maintaining the presentation of content.

7. The method of claim 6, further comprising providing instructions to the client device that cause the client device to recall the first state of the communication session in response to selection of the first selectable element.

8. The method of claim 6, wherein the first session data includes data representative of at least one of:

the subject user completing a web-based form, the subject user completing a web-based search, the subject user completing a transaction for an item, or the subject user listing an item for sale.

9. The method of claim 6, wherein the grouping is based on at least one of:

one or more similar attributes of the first and second states of the communication session, contextual information included in the first and second session data, or similar operations performed that resulted in the first and second state.

10. The method of claim 6, wherein the label assigned to the grouping is based on information contained in at least one of the first and second session data.

11. The method of claim 6, wherein the label assigned to the grouping is based on a user specified label.

12. The method of claim 6, wherein:

the first state of the communication session corresponds to a first item listing; and the second state of the communication session corresponds to a second item listing.

13. The method of claim 6, further comprising causing an additional client device to recall the first state of the communication session.

14. The method of claim 6, further comprising deleting the first session data in response to determining an expiration time period has elapsed.

15. The method of claim 6, further comprising causing presentation of a visual comparison of the first and second states of the communication session.

16. The method of claim 15, wherein the visual comparison includes a display of:

a first set of attributes corresponding to a first item associated with the first state of the communication session; and a second set of attributes corresponding to a second item associated with the second state of the communication session.

17. The method of claim 6, wherein the hiding the display of the interface element comprises causing presentation of the content without displaying the interface element.

18. A non-transitory machine-readable storage medium embodying instructions that, when executed by a machine, cause the machine to perform operations comprising:

establishing a communication session with a client device operated by a subject user;

in response to receiving user input, storing first session data representative of a first state of the communication session, the first state of the communication session including a presentation of content within a user interface displayed on the client device, the content including an image;

grouping the first session data with second session data representative of a second state of the communication session; and updating the user interface to include an interface element presented in conjunction with the presentation of content, the interface element comprising:
- a first selectable element comprising the image corresponding to the first state of the communication session, the first selectable element operable to recall the first state of the communication session in response to selection of the first selectable element,
- a second selectable element corresponding to the second state of the communication session,
- a label assigned to the grouping of the first and second session data, and
- a third selectable element to hide the interface element, and in response to receiving user input indicative of an interaction with the third selectable element, hiding the display of the interface element in the user interface while maintaining the presentation of content.

\* \* \* \* \*